United States Patent
Chan et al.

(10) Patent No.: US 11,644,892 B2
(45) Date of Patent: *May 9, 2023

(54) SYNTHESIZING HAPTIC AND SONIC FEEDBACK FOR TEXTURED MATERIALS IN INTERACTIVE VIRTUAL ENVIRONMENTS

(71) Applicant: Meta Platforms Technologies, LLC, Menlo Park, CA (US)

(72) Inventors: Sonny Chan, Calgary (CA); Nicholas Colonnese, Kirkland, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/873,045

(22) Filed: Jul. 25, 2022

(65) Prior Publication Data

US 2022/0365590 A1    Nov. 17, 2022

Related U.S. Application Data

(63) Continuation of application No. 17/035,558, filed on Sep. 28, 2020, now Pat. No. 11,416,065.

(Continued)

(51) Int. Cl.
*G06F 3/01* (2006.01)
*G06F 3/16* (2006.01)

(52) U.S. Cl.
CPC .............. *G06F 3/011* (2013.01); *G06F 3/016* (2013.01); *G06F 3/167* (2013.01)

(58) Field of Classification Search
CPC ............ G05B 2219/40553; G06F 3/016; G06F 3/04886; B60W 50/16; F15B 13/14; H01H 13/85

See application file for complete search history.

(56) References Cited

U.S. PATENT DOCUMENTS 6,839,663 B1 * 1/2005 Temkin ................... G06T 17/00
345/184
7,301,648 B2 * 11/2007 Foxlin .................. G02B 27/017
356/620

(Continued)

OTHER PUBLICATIONS

Non-Final Office Action dated Dec. 15, 2021 for U.S. Appl. No. 17/035,558, filed Sep. 28, 2020, 12 pages.

(Continued)

*Primary Examiner* — William Lu
(74) *Attorney, Agent, or Firm* — Morgan, Lewis & Bockius LLP

(57) ABSTRACT

A method generates synchronized auditory and haptic feedback for artificial-reality environments. The method includes performing a simulation of a user interaction with a virtual object in an artificial-reality environment. The user interaction (i) traverses a surface of the virtual object (e.g., running a finger over a textured surface), and (ii) includes a set of contact events (e.g., a sparse set of events). The method also includes estimating a trajectory of the user interaction with the virtual object based on the set of contact events. The method also includes determining a surface profile associated with the surface of the virtual object, generating an excitation force profile according to (i) the estimated trajectory and (ii) the surface profile, and rendering, based on the excitation force profile, audio and synchronized haptic feedback for the user interaction.

20 Claims, 18 Drawing Sheets

Related U.S. Application Data

(60) Provisional application No. 62/933,262, filed on Nov. 8, 2019.

(56) References Cited

U.S. PATENT DOCUMENTS

| | | | | |
|---|---|---|---|---|
| 9,761,210 | B2* | 9/2017 | McPherson | G10H 1/0066 |
| 10,565,743 | B1* | 2/2020 | Ma | G06T 11/60 |
| 2002/0163498 | A1* | 11/2002 | Chang | G06T 11/206 |
| | | | | 345/156 |
| 2005/0093847 | A1* | 5/2005 | Altkorn | G06F 3/016 |
| | | | | 345/184 |
| 2009/0021513 | A1* | 1/2009 | Joshi | G06T 15/005 |
| | | | | 345/419 |
| 2009/0278798 | A1* | 11/2009 | Kim | G06F 3/017 |
| | | | | 345/158 |
| 2012/0038639 | A1* | 2/2012 | Mora | G06T 19/20 |
| | | | | 345/420 |
| 2012/0065714 | A1* | 3/2012 | Szasz | A61N 1/403 |
| | | | | 607/101 |
| 2012/0123232 | A1* | 5/2012 | Najarian | A61B 5/0022 |
| | | | | 600/407 |
| 2013/0116852 | A1* | 5/2013 | Dijk | G06F 3/016 |
| | | | | 700/301 |
| 2014/0195023 | A1* | 7/2014 | Statham | A61B 5/1038 |
| | | | | 700/91 |
| 2014/0320431 | A1* | 10/2014 | Cruz-Hernandez | G06F 3/016 |
| | | | | 345/173 |
| 2016/0274662 | A1* | 9/2016 | Rimon | G06F 3/16 |
| 2017/0083115 | A1 | 3/2017 | Speck | |
| 2018/0039333 | A1* | 2/2018 | Carter | G06F 3/0416 |
| 2018/0356893 | A1* | 12/2018 | Soni | G06F 3/014 |
| 2019/0302887 | A1* | 10/2019 | Sinclair | G06F 3/016 |
| 2019/0384397 | A1* | 12/2019 | Cruz-Hernandez | G06F 3/016 |
| 2019/0391647 | A1* | 12/2019 | Rihn | G06F 3/017 |
| 2020/0019245 | A1* | 1/2020 | Ganadas | G06F 3/016 |
| 2020/0093679 | A1* | 3/2020 | Sonar | G01L 5/228 |
| 2020/0122403 | A1* | 4/2020 | Dhokia | B29C 64/393 |
| 2020/0211220 | A1* | 7/2020 | Ilic | G06K 9/6215 |
| 2020/0218354 | A1* | 7/2020 | Beattie | G06T 19/006 |
| 2020/0356174 | A1* | 11/2020 | Andreff | G06F 3/03545 |
| 2020/0394826 | A1* | 12/2020 | Ma | G06T 7/11 |

OTHER PUBLICATIONS

Notice of Allowance dated Apr. 5, 2022 for U.S. Appl. No. 17/035,558, filed Sep. 28, 2020, 8 pages.

Ren Z., et al., "Synthesizing Contact Sounds Between Textured Models," Conference Paper, IEEE, Apr. 2020, 9 pages, DOI: 10.1109/VR.2010.5444799.

* cited by examiner

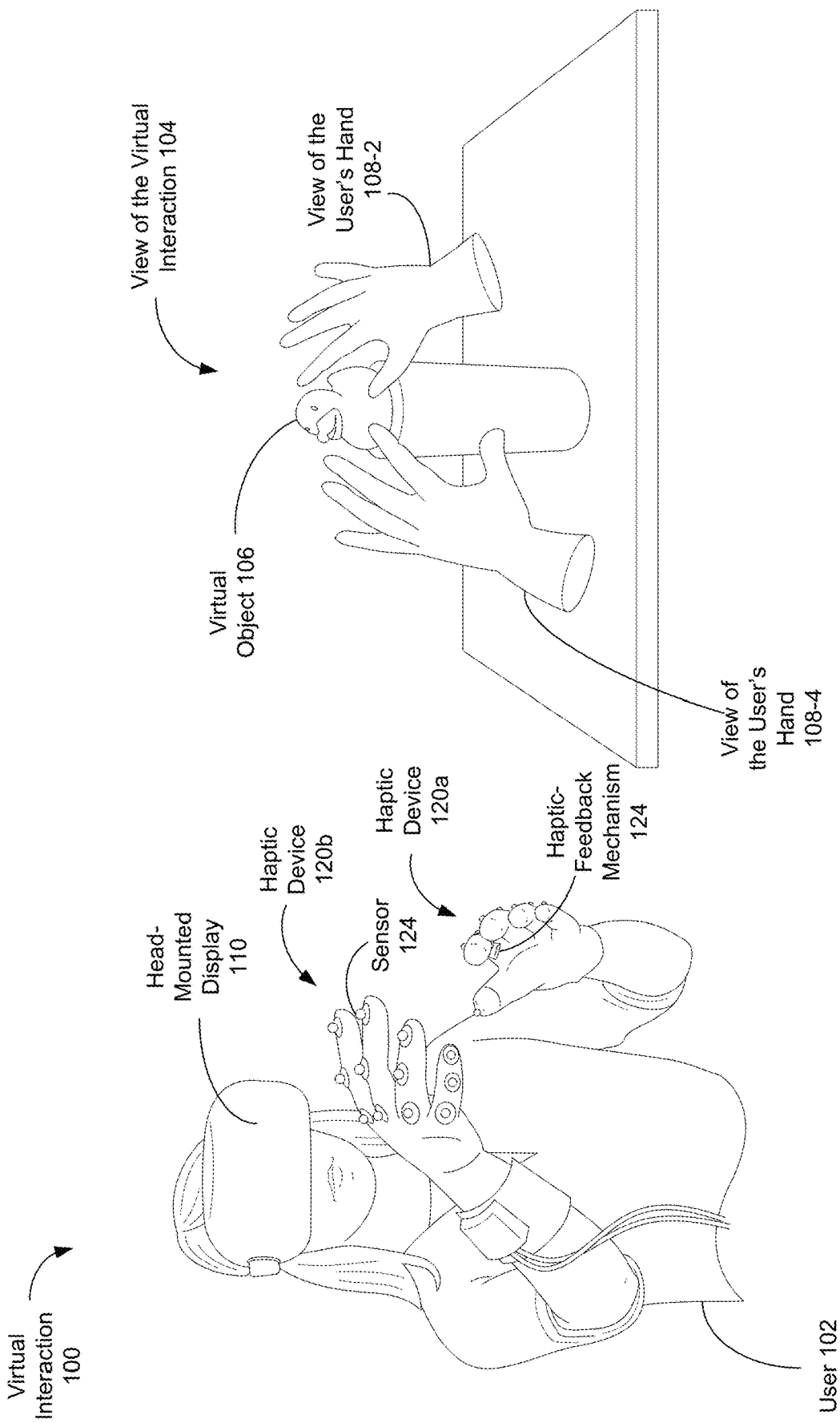

Example Texture Maps 300

Obtain sparsely sampled contact information of the user interaction, including position, velocity, and force of the user interaction. 1214

Figure 12B

Capture meso-level geometric features of the surface of the virtual object. 1216

Figure 12C

Generate information on the contact events at a rate of approximately 60 Hertz. 1218

Figure 12D

Interpolate contact positions with the contact events of the user interaction, and each contact position corresponds to a relief height over the surface of the virtual object. 1220

Apply a filter to the estimated trajectory to smooth the estimated trajectory. 1222

The contact positions interpolated with the contact events of the user interaction are sampled at a predetermined rate. 1224

Figure 12E

SYNTHESIZING HAPTIC AND SONIC FEEDBACK FOR TEXTURED MATERIALS IN INTERACTIVE VIRTUAL ENVIRONMENTS

RELATED APPLICATION

This application is a continuation of U.S. application Ser. No. 17/035,558, filed Sep. 28, 2020, entitled Synthesizing Haptic and Sonic Feedback for Textured Materials in Interactive Virtual Environments," which claims priority to U.S. Provisional Application Ser. No. 62/933,262, filed Nov. 8, 2019, entitled "Synthesizing Haptic and Sonic Feedback for Textured Materials in Interactive Virtual Environments," each of which is incorporated by reference herein in its entirety.

TECHNICAL DATA FIELD

This application relates generally to interactive virtual environments, including but not limited to creating haptic and sonic feedback for textured materials in interactive virtual environments.

BACKGROUND

Rich and consistent visual, auditory, and haptic cues greatly increase a participant's sense of immersion when interacting with objects in a mixed reality (e.g., augmented reality (AR) or virtual reality (VR)) environment. While it is possible to record segments of audio and haptics (e.g., forces and/or accelerations) for triggered replay within the environment, doing this for every possible type of interaction with a virtual object quickly becomes an unwieldy problem. Thus, methods for synthesizing high quality auditory and haptic feedback from physical and geometrical properties of the virtual objects are of great interest.

Modal synthesis is an effective method for generating realistic sounds from transient and sustained contact events with virtual objects in real time. However, modal synthesis requires an accurate vibration model of the object that is typically created offline. Modal synthesis also requires an "excitation" force profile (generated interactively) to excite the vibration modes of the virtual object.

SUMMARY

The embodiments herein address the problem of generating a realistic excitation force profile from a series of contact events detected from a macro-level simulation of virtual object interaction, to drive the modal synthesis for realistic auditory feedback. Additionally, the same excitation forces are rendered through appropriate actuators (e.g., on a glove) to display haptic feedback that is consistent with the real-time synthesized audio.

In accordance with some embodiments, a method synthesizes vibrotactile haptic and sound feedback for interaction with textured objects, from a geometric representation, a material description, and a single exemplar of its sonic characteristics. In some embodiments, the method uses a high-rate dynamic simulation to model the sliding contact dynamics at a microscopic level. In some embodiments, the method uses Hertz contact theory to estimate a contact force profile (e.g., duration, peak force) of an impact and thereby generates realistic sounds for contact between different materials. Some embodiments use contact simulation to generate haptic feedback, signals for vibrotactile actuators.

In accordance with some embodiments, a method is performed for generating synchronized auditory and haptic feedback for artificial-reality environments. The method includes performing a simulation of a user interaction with a virtual object in an artificial-reality environment. The user interaction (i) traverses a surface of the virtual object and (ii) includes a set of contact events. The method also includes estimating a trajectory of the user interaction with the virtual object based on the set of contact events. The method also includes determining a surface profile associated with the surface of the virtual object, generating an excitation force profile according to (i) the estimated trajectory and (ii) the surface profile, and rendering, based on the excitation force profile, audio and synchronized haptic feedback for the user interaction.

In some embodiments, determining the surface profile includes generating a height profile of the surface of the virtual object along the estimated trajectory of the user interaction, and applying one or more surface parameters of the surface of the virtual object to the height profile to obtain the surface profile.

In some embodiments, generating the height profile of the surface further includes calculating the height profile based on meso-level surface geometry corresponding to the virtual object. In some embodiments, generating the height profile of the surface further includes indexing the meso-level surface geometry from one or more texture-map images associated with the virtual object.

In some embodiments, the one or more surface parameters correspond to a texture of the surface of the virtual object, the one or more surface parameters includes a surface roughness parameter for the texture of the surface, and applying the one or more surface parameters includes adding micro-level geometry via fractal noise controlled by the surface roughness parameter.

In some embodiments, the surface roughness parameter includes surface texture and roughness material qualities associated with the virtual object.

In some embodiments, the surface roughness parameter includes attributes created or assigned by a scene artist, or inferred or captured directly from a real-world counterpart of the virtual object.

In some embodiments, the method further includes simulating body dynamics of the user along the surface profile, and generating the excitation force profile is further performed according to the simulated body dynamics of the user. In some embodiments, simulating the body dynamics of the user comprises simulating traversal across the surface profile with a mass-spring-damper system that approximates the body dynamics of a portion of the user's body that is interacting with the surface. In some embodiments, the mass-spring-damper system approximates the portion of the user's body as a point mass, and simulating the body dynamics of the user further includes (i) detecting collisions between the point mass and the surface profile and (ii) applying reactionary impulse forces.

In some embodiments, rendering the audio includes determining a timbre based on (i) characteristics of the mass-spring-damper system and (ii) the surface profile. In some embodiments, rendering the audio includes applying one or more numerical methods to integrate equations of motion derived from the mass-spring-damper system.

In some embodiments, estimating the trajectory includes interpolating contact positions with the contact events of the user interaction, and each contact position corresponds to a relief height over the surface of the virtual object. In some embodiments, the method further includes applying a filter to the estimated trajectory to smooth the estimated trajectory. In some embodiments, the contact positions interpolated with the contact events of the user interaction are sampled at a predetermined rate.

In some embodiments, performing the simulation includes obtaining sparsely sampled contact information of the user interaction, including position, velocity, and force of the user interaction. In some embodiments, performing the simulation further includes capturing meso-level geometric features of the surface of the virtual object. In some embodiments, performing the simulation includes generating information on the contact events at a rate of approximately 60 Hz.

In accordance with some embodiments, an artificial-reality device is provided for generating synchronized auditory and haptic feedback for artificial-reality environments. The artificial-reality device includes one or more processors, memory that stores one or more programs configured for execution by the one or more processors, and the one or more programs comprising instructions for performing any of the methods described herein.

In accordance with some embodiments, a non-transitory computer readable storage medium stores one or more programs configured for execution by an artificial reality device having one or more processors. The one or more programs include instructions for performing any of the methods described herein.

Thus, methods, systems, and devices are provided for generating synchronized auditory and haptic feedback for artificial-reality environments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A is an illustration of a user interaction with a virtual object in a virtual environment, according to some embodiments.

FIG. 1B is an illustration of a view of the virtual interaction shown in FIG. 1A, according to some embodiments.

FIGS. 12A-12G are flowcharts of a method for generating synchronized auditory and haptic feedback for artificial-reality environments, according to some embodiments.

DESCRIPTION OF EMBODIMENTS

Figure 1C:
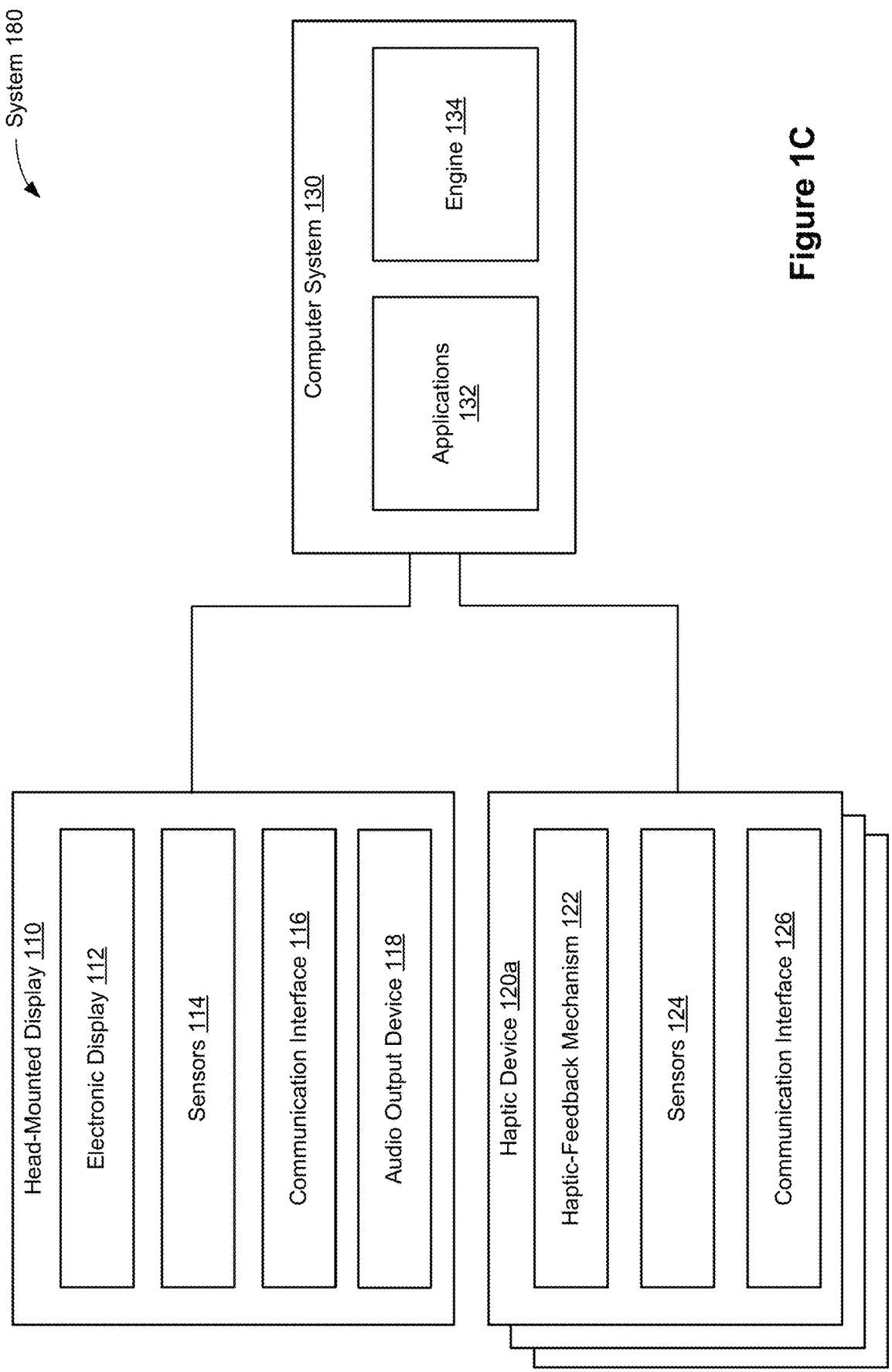
FIG. 1C is a block diagram of a system for synthesizing haptic and sonic feedback for textured materials in interactive virtual environments, according to some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first, second, etc. are, in some instances, used herein to describe various elements, these elements should not be limited by these terms. These terms are used only to distinguish one element from another.

As mentioned earlier, there is a need for virtual environments that provide rich sensory feedback to users (e.g., via haptic devices, such as gloves, and/or audio devices). Similar to how physically-based rendering and physically-based material definitions increase visual realism by the use of material properties, the disclosed techniques use such properties to generate realistic haptic and sound feedback. Some embodiments synthesize vibrotactile haptic and sound feedback from virtual object geometry and material descriptions. Some embodiments simulate hand- or finger-based interactions with the virtual environment, and render haptic feedback through vibrotactile actuators. With that in mind, FIG.

1A is an illustration of a virtual interaction 100, according to some embodiments. In particular, a user 102 is shown wearing a head-mounted display 110 (an example of an artificial-reality device) and haptic devices 120a and 120b (in this case, haptic gloves). The user is interacting with a virtual object 106 in a virtual environment.

FIG. 1B is an illustration of a view 104 (e.g., a view as observed by the user 102 through the display 110 in FIG. 1A) of the virtual interaction shown in FIG. 1A, according to some embodiments. The example view of the virtual environment shown in FIG. 1B shows the user's hands (108-2 and 108-4) interacting with the virtual object 106. Also shown, one or more sensors on the haptic gloves worn by the user can enable the artificial-reality device (e.g., computer 130) to track the gloves. Based on the tracking, render images of the user's hands are generated by the artificial-reality device, as shown in FIG. 1B. In some embodiments, the artificial-reality device worn by the user also includes built-in audio devices. In some embodiments, the system disclosed herein also includes external audio devices for rendering synthesized audio. As will be discussed in detail below, the system disclosed herein can dynamically (e.g., in real-time) synthesize and render audio and haptic feedback for the virtual interaction (e.g., the virtual interaction shown in FIGS. 1A and 1B).

FIG. 1C is a block diagram of a system 180 for synthesizing haptic and sonic feedback for textured materials in interactive virtual environments, according to some embodiments. While some example features are illustrated, various other features have not been illustrated for the sake of brevity and so as not to obscure pertinent aspects of the example embodiments disclosed herein. To that end, as a non-limiting example, the system 180 includes one or more haptic devices 120. In some embodiments, the one or more haptic devices 120 are used in conjunction with a computer system 130 (sometimes referred to a "remote computer system") and/or a head-mounted display 110 (e.g., a virtual-reality headset, an augmented-reality headset, or a mixed-reality headset). In some embodiments, the system 180 provides the functionality of a virtual-reality device with synchronized haptic and audio feedback, an augmented-reality device with synchronized haptic and audio feedback, a mixed-reality device with synchronized haptic and audio feedback, or some combination thereof.

In embodiments, the head-mounted display 110 presents media to a user. Examples of media presented by the head-mounted display 110 include images, video, audio, or some combination thereof. In some embodiments, audio is presented via an external device (e.g., speakers and/or headphones) that receives audio information from the head-mounted display 110, the computer system 130, or both, and presents audio data based on the audio information.

In some embodiments, the head-mounted display 110 includes an electronic display 112, sensors 114, a communication interface 116, and an audio output device 118 (or an audio interface in communication with an audio output device). The electronic display 112 displays images to the user in accordance with data received from the computer system 130. In various embodiments, the electronic display 112 may comprise a single electronic display 112 or multiple electronic displays 112 (e.g., one display for each eye of a user).

The sensors 114 include one or more hardware devices that detect spatial and motion information about the head-mounted display 110. Spatial and motion information can include information about the position, orientation, velocity, rotation, and acceleration of the head-mounted display 110. For example, the sensors 114 may include one or more inertial measurement units (IMUs) that detect rotation of the user's head while the user is wearing the head-mounted display 110. This rotation information can then be used (e.g., by the engine 134) to adjust the images displayed on the electronic display 112. In some embodiments, each IMU includes one or more gyroscopes, accelerometers, and/or magnetometers to collect the spatial and motion information. In some embodiments, the sensors 114 include one or more cameras positioned on the head-mounted display 110.

The communication interface 116 enables input and output to the computer system 130. In some embodiments, the communication interface 116 is a single communication channel, such as HDMI, USB, VGA, DVI, or DisplayPort. In other embodiments, the communication interface 116 includes several distinct communication channels operating together or independently. In some embodiments, the communication interface 116 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any other suitable communication protocol. The wireless and/or wired connections may be used for sending data collected by the sensors 114 from the head-mounted display 110 to the computer system 130. In such embodiments, the communication interface 116 may also receive audio/visual data to be rendered on the electronic display 112.

The one or more audio devices 118 output audio/sound. In some embodiments, the one or more audio devices 118 may also receive audio data (from the computer system 130) to be rendered on the electronic display 112. The audio data form the computer system 130 may be generated by the computer system 130 using the methods described herein. In some embodiments, the computer system 130 may implement one or more steps shown in FIG. 5 to generate, among other things, the audio data. As mentioned above, in some embodiments, the one or more audio devices 118 are part of the head-mounted display 110. In some other embodiments, the one or more audio devices 118 are separate from the head-mounted display 110. In such embodiments, the head-mounted display 110 includes an audio interface coupled with the one or more audio devices 118.

The haptic device 120 may be integrated with a wearable device, which includes a garment worn by the user (e.g., a glove, a shirt, or pants). FIG. 1A (described above) shows an example of a user 102 wearing a haptic glove. The haptic device 120 may also be integrated with another device, such as a game controller. The haptic device 120 includes a haptic-feedback mechanism 122, haptic sensors 124, and a communication interface 126. The haptic device 120 may include additional components that are not shown in FIG. 1C, such as a power source (e.g., an integrated battery, a connection to an external power source, a container containing compressed air, or some combination thereof), one or more processors, and memory.

The haptic device 120 is configured to provide haptic feedback (i.e., haptic stimulations or haptic cues) to the user. To accomplish this, the haptic device 120 includes one or more haptic-feedback mechanisms 122, which are configured to create haptic stimulations for a user of the haptic device. The haptic-feedback mechanisms 122 are able to create different haptic stimulations by acting alone, or by acting in consort.

In some embodiments, the haptic sensors 124 include one or more hardware devices that detect spatial and motion information about the haptic device 120. Spatial and motion information can include information about the position, orientation, velocity, rotation, and acceleration of the haptic device 120, a device in which the haptic device 120 is integrated with, or any subdivisions of the haptic device 120, such as fingers, fingertips, knuckles, the palm, or the wrist when the haptic device 120 is part of a glove. The haptic sensors 124 may be IMUs, as discussed above with reference to the sensors 114.

The haptic communication interface 126 enables input and output to the computer system 130. In some embodiments, the haptic communication interface 126 is a single communication channel, such as USB. In other embodiments, the haptic communication interface 126 includes several distinct communication channels operating together or independently. For example, the communication interface 126 may include separate communication channels for receiving control signals for the haptic-feedback mechanism 122 and sending data from the haptic sensors 124 to the computer system 130. The one or more communication channels of the haptic communication interface 126 can be implemented as wired or wireless connections. In some embodiments, the haptic communication interface 126 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document.

Figure 1D:
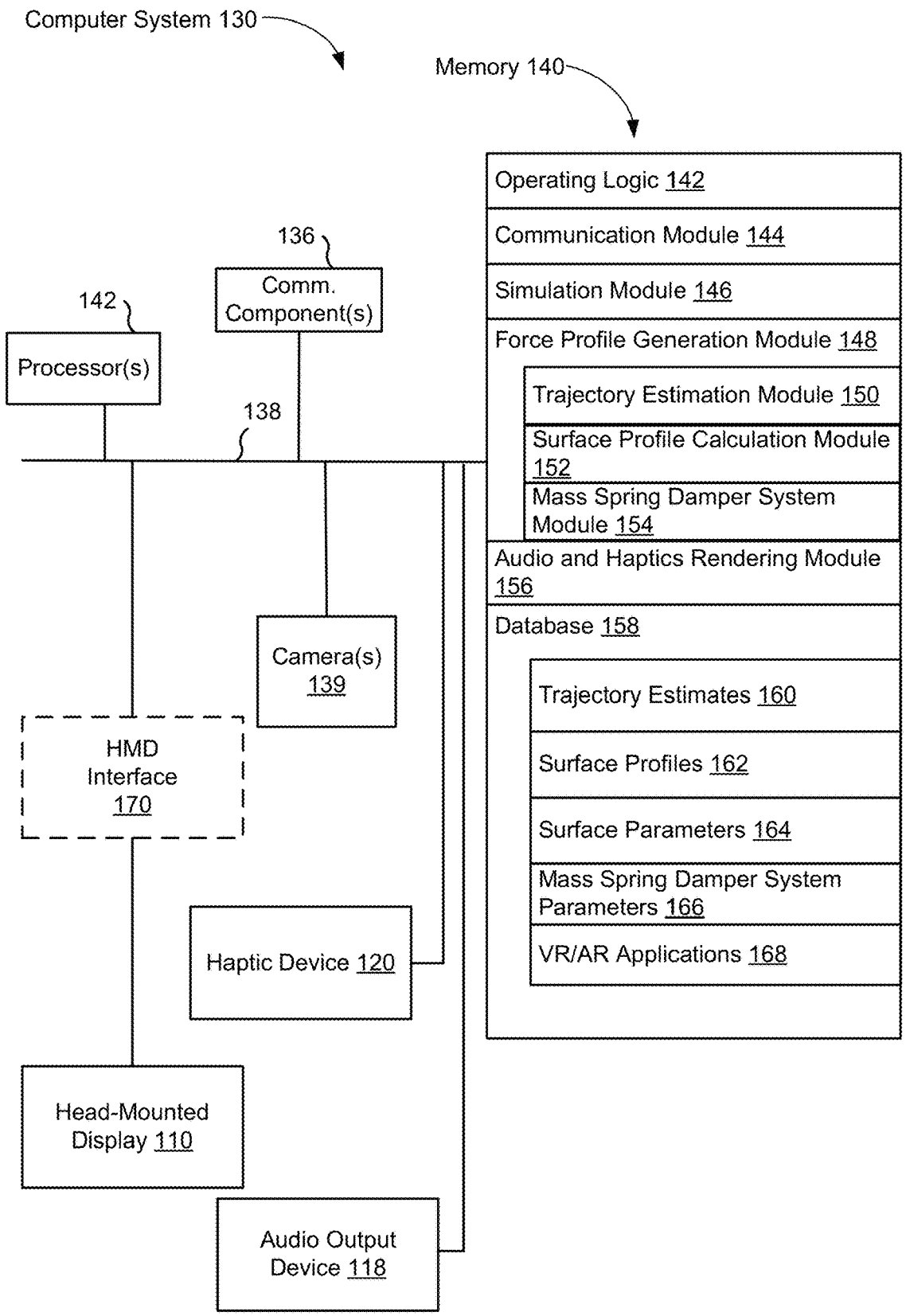
FIG. 1D is a block diagram of a computer system for synthesizing haptic and sonic feedback for textured materials in interactive virtual environments, according to some embodiments.

FIG. 1D is a block diagram of the computer system 130 shown in FIG. 1C. In some embodiments, the computer system 130 is a computing device that executes applications 132 (e.g., virtual-reality applications, augmented-reality applications, mixed-reality applications, and the like) to process input data from the sensors 114 on the head-mounted display 110 and the haptic sensors 124 on the haptic device 120. In some embodiments, the computer system 130 provides output data for (i) the electronic display 112 on the head-mounted display 110, (ii) the audio output device 118 (sometimes referred to herein "audio devices 118") on the head-mounted display 110, and/or (iii) the haptic device 120 (e.g., processors of the haptic device 120).

In some embodiments, the computer system 130 sends instructions (e.g., the output data) to the haptic device 120 using a communication interface 136. In response to receiving the instructions, the haptic device 120 creates one or more haptic stimulations (e.g., using the haptic-feedback mechanism 122). Alternatively, in some embodiments, the computer system 130 sends instructions to an external device, such as a wearable device, a game controller, or some other Internet of things (IOT) device, and in response to receiving the instructions, the external device creates one or more haptic stimulations through the haptic device 120 (e.g., the output data bypasses the haptic device 120). Although not shown, in the embodiments that include a distinct external device, the external device may be connected to the head-mounted display 110, the haptic device 120, and/or the computer system 130 via a wired or wireless connection.

In some embodiments, the computer system 130 sends instructions to the head-mounted display 110 using a communication interface 136. In response to receiving the instructions, the head-mounted display 110 may present information on the electronic device 112. Alternatively or in addition, in response to receiving the instructions, the head-mounted display 110 may generate audio using the audio output device 118. In some embodiments, the instructions sent to the head-mount display 110 correspond to the instructions sent to the haptic device 120. For example, the audio generated by the audio output device 118 may be associated with the one or more haptic stimulations created by the haptic device 120.

The computer system 130 can be implemented as any kind of computing device, such as an integrated system-on-a-chip, a microcontroller, a console, a desktop or laptop computer, a server computer, a tablet, a smart phone, or other mobile device. Thus, the computer system 130 includes components common to typical computing devices, such as a processor, random access memory, a storage device, a network interface, an I/O interface, and the like. The processor may be or include one or more microprocessors or application specific integrated circuits (ASICs). The memory may be or include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either a wired or a wireless interface. The I/O interface connects the processor to peripherals (not shown) such as, for example and depending upon the computing device, sensors, displays, cameras, color sensors, microphones, keyboards, and USB devices.

In the example shown in FIG. 1C, the computer system 130 includes applications 132 (e.g., virtual-reality applications, augmented-reality applications, mixed-reality application, and the like) and an engine 134 (e.g., a virtual-reality engine or a controller for the haptic device 120). In some embodiments, the applications 132 and the engine 134 are implemented as software modules that are stored on the storage device and executed by the processor. Some embodiments of the computer system 130 include additional or different components than those described in conjunction with FIG. 1C. Similarly, the functions further described below may be distributed among components of the computer system 130 in a different manner than is described here.

In some embodiments, each application 132 is a group of instructions that, when executed by a processor, generates content for presentation to the user. An application 132 may generate content in response to inputs received from the user via movement of the head-mounted display 110 or the haptic device 120. Examples of applications 132 include gaming applications, conferencing applications, and video playback applications.

In some embodiments, the engine 134 is a software module that allows applications 132 to operate in conjunction with the head-mounted display 110 and/or the haptic device 120. In some embodiments, the engine 134 receives information from the sensors 114 on the head-mounted display 110 and provides the information to an application 132. Based on the received information, the engine 134 determines media content to provide to the head-mounted display 110 for presentation to the user via the electronic display 112 or the one or more audio devices 118, and/or a type of haptic feedback to be created by the haptic device 120. For example, if the engine 134 receives information from the sensors 114 on the head-mounted display 110 indicating that the user has looked to the left, the engine 134 generates content for the head-mounted display 110 that mirrors the user's movement in a virtual environment. As another example, if the user hits a wall, the engine 134 generates control signals for the haptic-feedback mechanism 122 to generate a strong vibration, and audio that corresponds to the user action (e.g., sound of a human first striking a wooden wall, or sound of a human first hitting a Plexiglas wall, which would be different from the sound generated for the wooden wall).

Similarly, in some embodiments, the engine 134 receives information from the haptic sensors 124 on the haptic device 120 and provides the information to an application 132. The application 132 can use the information to perform an action within the virtual world of the application 132. For example, if the engine 134 receives information from the sensors 124 that the user has raised his hand, a simulated hand in the application 132 lifts to a corresponding height. In some embodiments, the engine 134 generates control signals for the haptic-feedback mechanism 122, which cause the haptic-feedback mechanism 122 to create one or more haptic cues. As noted above, the information received by the engine 134 can also include information from the head-mounted display 110. For example, cameras on the head-mounted display 110 may capture movements of the haptic device 120, and the application 132 can use this additional information to perform the action within the virtual world of the application 132.

The engine 134 may also provide feedback to the user that the action was performed. The provided feedback may be visual via the electronic display 112 in the head-mounted display 110, auditory via the one or more audio devices 118 in the head-mounted display 110, and/or haptic via one or more of the haptic-feedback mechanisms 122 in the haptic device 120. For example, if a haptic device 120 is attached to a user's forearm, one or more haptic-feedback mechanisms 122 of the haptic device 120 may create one or more haptic cues (e.g., vibrations and/or pressure stimulations) on the user's forearm to simulate the sensation of an avatar in a virtual-reality video game touching the arm of the user's avatar. To do this, in some embodiments, the haptic device 120 activates a haptic-feedback mechanism 122 based on an instruction (i.e., control signal) from the computer system 130.

As mentioned above, in some embodiments, the haptic stimulations created by the haptic device 120 can correspond to data presented (either visually or auditory) by the head-mounted display 110 (e.g., an avatar touching the user's avatar). Thus, the haptic device 120 is used to further immerse the user in virtual- and/or augmented-reality experience such that the user not only sees (at least in some instances) the data on the head-mounted display 110, but the user may also "feel" certain aspects of the displayed data.

In some embodiments, the computer system 130 includes one or more processing units 142 (e.g., CPUs, microprocessors, and the like), a communication interface 136 (similar to the communication interfaces 116 and 126), memory 140, and one or more communication buses 138 for interconnecting these components (sometimes called a chipset). In some embodiments, the computer system 130 includes cameras 139 and/or camera interfaces to communicate with external cameras, internal and/or external audio devices for audio responses.

In some embodiments, the memory 140 in the computer system 130 includes high-speed random access memory, such as DRAM, SRAM, DDR SRAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. The memory, or alternatively the non-volatile memory within memory, includes a non-transitory computer-readable storage medium. In some embodiments, the memory, or the non-transitory computer-readable storage medium of the memory, stores the following programs, modules, and data structures, or a subset or superset thereof:

operating logic 142, including procedures for handling various basic system services and for performing hardware dependent tasks;

a communication module 144, which couples to and/or communicates with remote devices (e.g., the haptic device 120, any audio devices 118, head-mounted display 110, and/or other wearable devices) in conjunction with the communication interface 136;

a simulation module 146, which simulates user interactions with the virtual environment at different levels (e.g., micro-level simulation, macro-level simulation);

a force profile generation module 148, which generates an excitation force profile for a virtual interaction of a user. In some embodiments, the force profile generation module 148 includes a trajectory estimation module 150, which estimates the trajectory of a user's contact with a virtual object (e.g., a virtual object having one or more textured surfaces). In some embodiments, the force profile generation module 148 includes a surface profile calculation module 152, which calculates surface profiles associated with a surface of the virtual object a user is interacting with. In some embodiments, the force profile generation module 148 includes a mass spring damper system module 154, which approximates the body dynamics of a portion of the user's body that is interacting with the surface;

an audio and haptics rendering module 156, which renders audio and/or haptic feedback (e.g., using the haptic devices 120, the head-mounted display 110, and/or the audio devices 118); and a database 158, which stores:
 trajectory estimates 160 generated by the trajectory estimation module 150;
 surface profiles 162 generated by the surface profile calculation module 152;
 surface parameters 164 used in determining surface profiles;
 mass spring damper system parameters 166 used by the module 154; and/or
 VR/AR applications 168 that make use of the synchronized haptic and/or audio feedback generated by the computer system 130.

Figure 2:
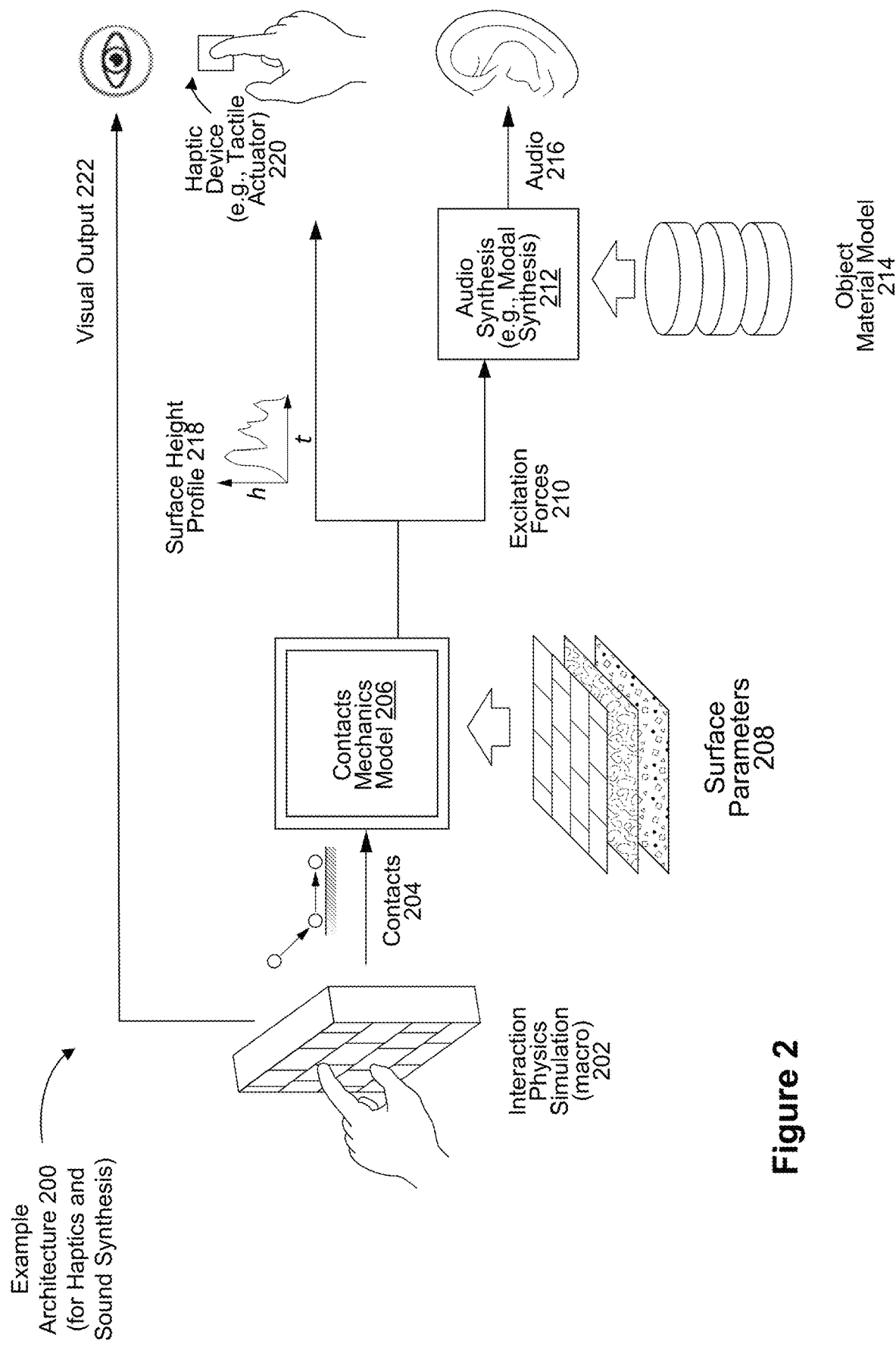
FIG. 2 illustrates an example architecture for haptics and sound synthesis, according to some embodiments.

FIG. 2 illustrates an example architecture 200 for haptics and sound synthesis, according to some embodiments. In particular, FIG. 2 illustrates a vibrotactile haptic and sound feedback synthesis system for manual interactions with a textured surface of a virtual object, according to some embodiments. In some embodiments, a user's hand pose is tracked to drive an articulated rigid-body physics simulation 202, which controls the simulation at a macroscopic scale.

The physics simulation 202 reports transient and persistent contacts, as well as their associated positions, velocities, and forces along the contact normal, which serve as inputs 204 to a micro-contact model 206 (sometimes called the contacts mechanics model) and simulation. In some embodiments, during a sliding contact, the micro-contact model 206 constructs a one-dimensional surface height profile 218 from the contact trajectory, indexing texture maps 208 (e.g., to extract surface parameters) and synthesizing fractal noise as necessary. Some embodiments also run a simulation of the contact dynamics between a finger (sometimes called a finger pad or a skin surface) and the textured surface, integrating the equations of motion at audio rates. In some embodiments, the resulting finger-pad displacements 218 are rendered through vibrotactile actuators 220 (e.g., haptic-feedback mechanism 122) as haptic feedback, and a stream of micro-contact impulses are used as an excitation signal 210 for modal synthesis 212 to generate the synchronized sound 216. In some embodiments, the modal synthesis module 212 uses object material models 214 (in addition to the excitation forces 210) to synthesize sound 216. These components are described in detail below. Some embodiments render visual output 222 corresponding to the haptic feedback and the synchronized sound 216.

Some embodiments receive static input including object geometry (e.g., polygonal mesh, displacement and roughness texture maps), object material (e.g., elasticity, compressibility, density), and sonic impulse response. Some embodiments also receive dynamic input including contact events from a coarse level physics simulation of the interaction. Some embodiments output haptic and audio signals (e.g., audio signals transmitted to speakers or headphones, such as the audio output devices 118, haptic output transmitted to vibrotactile actuators, such as haptic-feedback mechanism 122) for a variety of user-object interactions (e.g., impacts, sliding contacts, etc.). Thus, the embodiments detailed herein enable realistic haptic and audio feedback for interaction with surfaces on virtual objects (e.g., the interaction illustrated in FIG. 1A or 1B), and/or reduce the need for additional content authoring by a human.

Physical interaction with objects elicits haptic feedback. Physical interaction with objects can also cause mechanical excitations that induce vibrations with them that often manifest as audible sounds. The discussion below details a novel approach to creating haptic feedback and audible sounds from interaction with objects in the virtual world.

Figure 3:
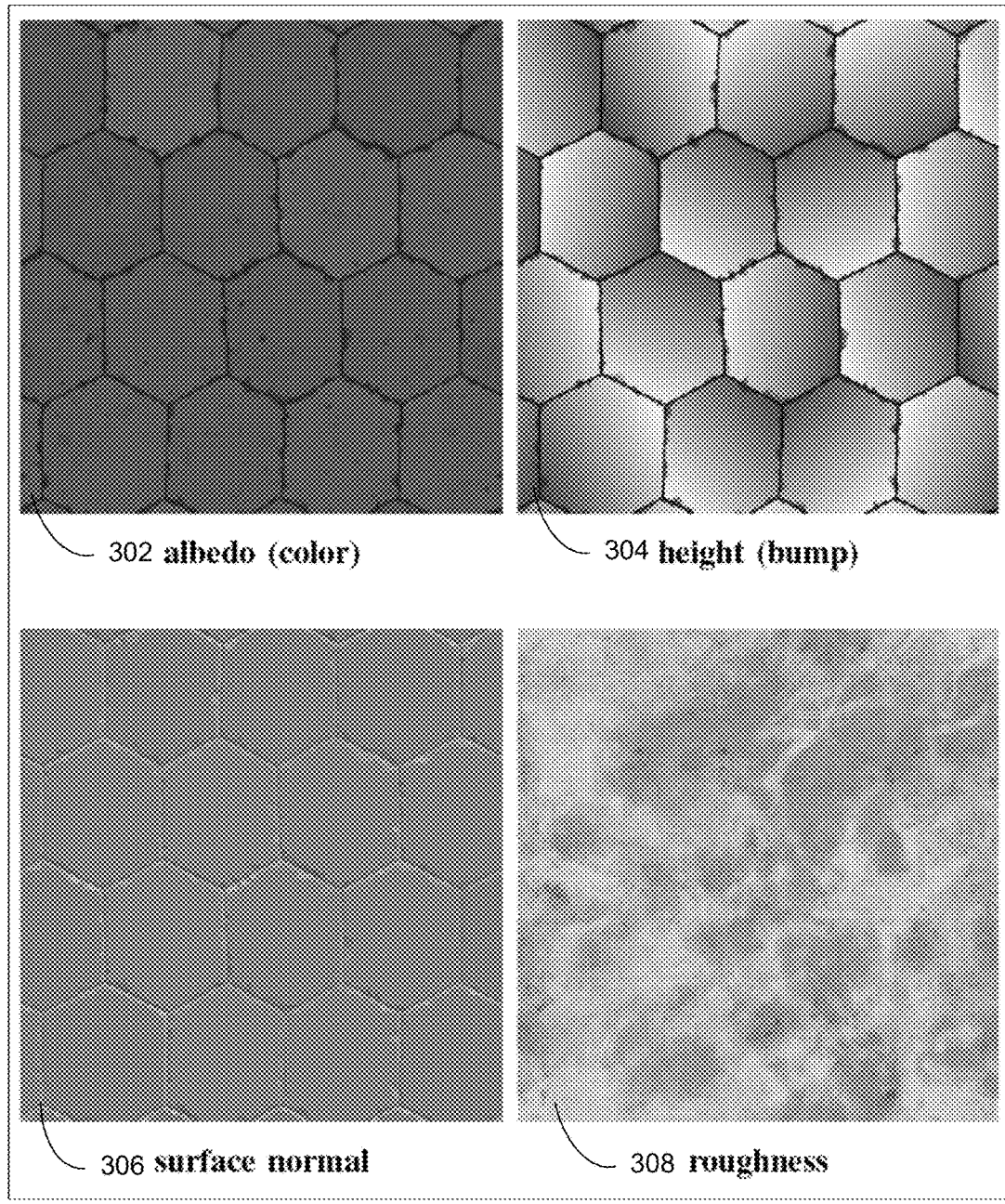
FIG. 3 illustrates example texture maps, according to some embodiments.

As discussed below, object geometry at many different scale levels (e.g., from centimeters to microns) may be used to generate sensory feedback when a user touches and/or manipulates virtual objects. To accomplish this, the methods discussed herein use distinct representations of an object's geometric features at three different scale levels: macro, meso, and micro. At the macro level (e.g., centimeter scale), an object's shape is represented by a polygonal mesh, in a manner similar to computer graphics applications. Some embodiments use collision detection and haptic rendering algorithms to support interactions with polygonal representations of virtual objects. Note it is possible to represent object surface geometry at a finer scale (e.g., sub-millimeter) using polygonal meshes. Some embodiments use texture map images to efficiently encode spatially-varying surface features, examples of which are shown by FIG. 3 texture maps 300. Some embodiments encode properties, illustrated in FIG. 3, such as albedo (color) 302, surface normal 306, relief height 304 (sometimes called height or bump), and/or roughness 308. Some embodiments use height maps that provide a meso-level (sub-millimeter scale) representation of surface features for haptic rendering. Some embodiments use texture maps typically associated with a material description suitable for physically-based visual rendering.

Figure 4:
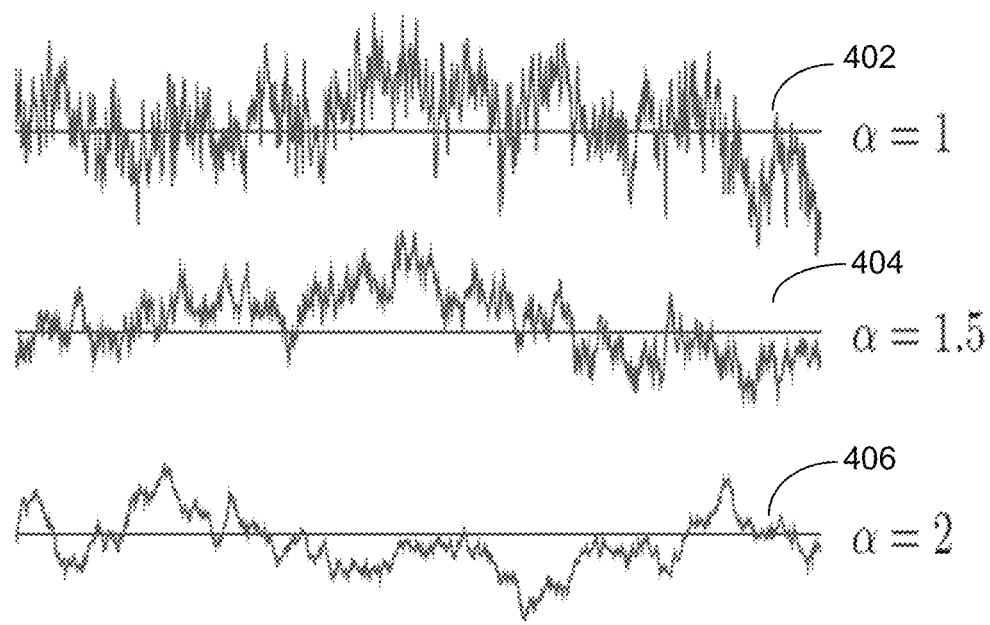
FIG. 4 illustrates example microscopic surface profiles, according to some embodiments.

Some embodiments also use microscopic surface features (e.g., micron scale features) to provide perception of roughness and surface texture. Because microscopic surface features are not distinctly visible, and can be costly to represent as high-resolution images, some embodiments use surface height profiles at the microscopic scale. Surface height profiles have been observed to be spatially self-similar, following a fractal ($1/f^\alpha$) noise distribution. This type of noise follows a spectral density power law, where its spectral power diminishes with increasing frequency, f, proportional to $1/f^\alpha$, usually with the parameter $0 \leq \alpha \leq 2$. For the micro-level representation, some embodiments overlay spatial fractal noise, modulated by the roughness texture map values, to capture microscopic variations of the surface geometry, as illustrated in FIG. 4. In particular, some embodiments represent microscopic surface profiles with ($1/f^\alpha$) fractal noise that varies with the roughness map. FIG. 4 illustrates surface profiles 402, 404, and 406, for three different surfaces. A fractal dimension of $\alpha+1$ describes a rougher surface (corresponding to the surface profile 402) than $\alpha+2$ (corresponding to the surface profile 406).

Macroscopic Simulation of Interaction

Although some of the description below focuses on modeling manual interactions, using hands and fingers to manipulate virtual objects, the techniques described herein work with other kinds of haptic interfaces as well. In some embodiments, a pose of the location and/or articulation of the participant's hand is continuously tracked and input to simulation. Some embodiments use hardware interfaces that provide such input (e.g., vision-based systems, depth-based trackers, and glove-based interfaces).

Similar to modern proxy-based haptic rendering methods, some embodiments maintain a simulation of an articulated hand whose pose can be distinct from that of the participant's actual hand. In some embodiments, this "proxy" hand's pose is coupled to the pose reported by the hand-tracking system (e.g., system 180) using an array of both linear and torsional virtual spring-dampers. Some embodiments use a real-time, rigid-body physics simulation to drive the simulation of the articulated proxy hand. In some embodiments, the rigid body physics simulation also controls the dynamic behavior of the virtual objects within the scene. In some embodiments, the rigid body physics simulation detects and reports both transient and sustained contact events, which serve as inputs to a micro-contact simulation. Some embodiments use data reported by the rigid body physics simulation, such as contact positions, relative velocities, and normal forces between the virtual fingers (or another "avatar" object) and the textured surfaces a user interacts with.

Micro-Contact Model and Simulation

Figure 5:
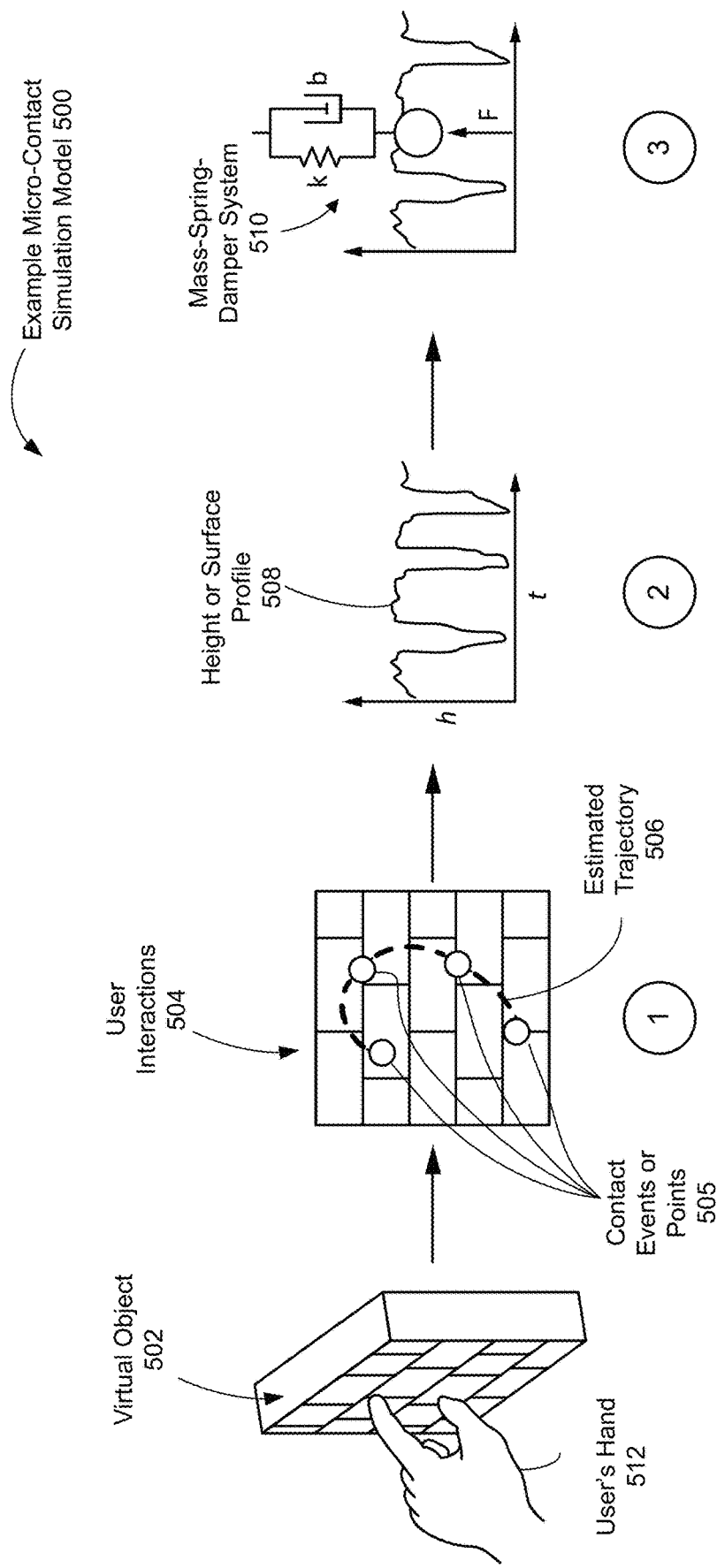
FIG. 5 illustrates an example micro-contact simulation model, according to some embodiments.

As detailed herein, a micro-contact model and simulation can be used for the purpose of haptic and audio synthesis. FIG. 5 illustrates a micro-contact simulation model 500 used to drive haptic feedback and sound synthesis, in accordance with some embodiments. The system shown in FIG. 5 has three stages (labeled 1, 2, and 3), although variations of the system employ different computational stages. A user's hand 512 is shown traversing (or moving across) a textured virtual object 502, resulting in user interactions 504 (sometimes called virtual interactions).

As shown, at stage 1, an input (e.g., discrete finger-object contact positions 505) is reported by the macroscopic physics simulation (e.g., the simulation 202 described above) at a predetermined rate (e.g., 60-200 Hz). Some embodiments transform the input to texture image coordinates with the mapping defined by the object's visual model. Some embodiments subsequently estimate (indicated by label 1) a smooth path 506 (sometimes called an estimated trajectory or a contact trajectory) of the contact point across texture image, sampled at a predetermined audio rate (e.g., 44.1 kHz), by applying a second-order low-pass filter to the input positions.

Some embodiments sample the texture height image (indicated by label 2) to obtain a one-dimensional signal (e.g., a 44.1 kHz signal) of surface height over time 508 (sometimes called a height profile, a surface profile, a surface height profile, or a height map)) of the contact trajectory 506. As the height maps do not have the spatial resolution to capture microscopic variations of the surface geometry, $(1/f^\alpha)$ fractal noise may be imparted onto the height profile as well. In some embodiments, the fractal dimension, $\alpha$, determines the perceived roughness of the texture, and is set by sampling the texture roughness image and applying a heuristic mapping. The $(1/f^\alpha)$ frequency distribution is spatial, but because of the self-similar nature of fractal noise, some embodiments convert the fractal noise to the temporal domain by an attenuation inversely proportional to traversal (tangential) velocity.

Figure 6:
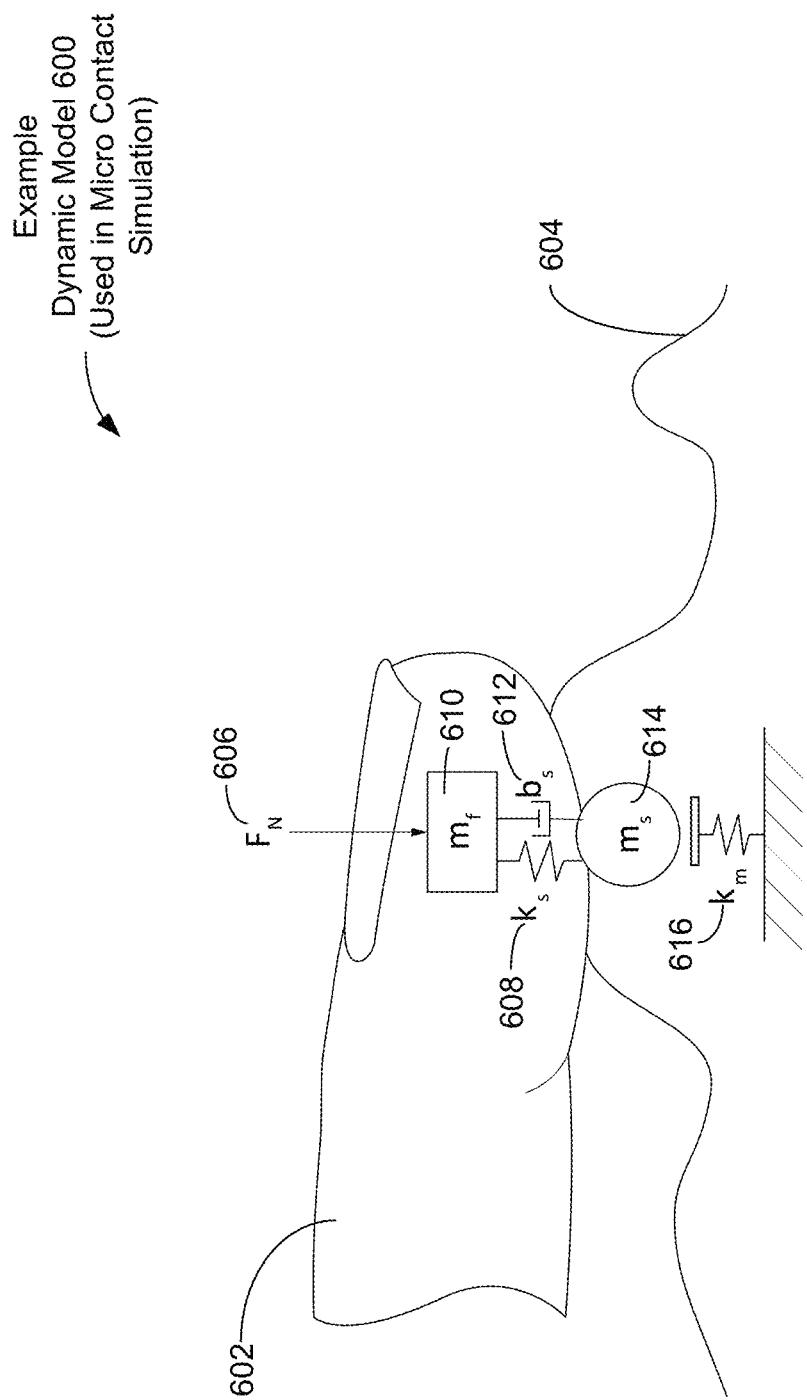
FIG. 6 illustrates an example dynamic model used in micro-contact simulation, according to some embodiments.

Some embodiments subsequently run a dynamic simulation of micro-contact mechanics (indicated by label 3) between the fingertip and the surface profile (e.g., using a mass-spring damper system 510). FIG. 6 illustrates an example dynamic model 600 of the finger 602, finger pad, and surface micro-geometry, used in the micro-contact simulation, according to some embodiments. The finger pad (skin surface) is modeled as a lumped mass (sometimes called a skin patch) 614 ($m_s$) connected to the finger 602 through a spring 608 ($k_s$) and damper 612 ($b_s$). Some embodiments model the finger 602 as a floating mass 610 ($m_f$) through which the downward contact force 606 ($F_N$) is applied. In some embodiments, the finger pad is also coupled to the surface profile 604 ($x_m(t)$) by a unilateral spring 616 ($k_m$) that only exerts a repelling force when the position of the finger pad is below the surface. In some embodiments, biomechanical properties of the fingertip are set to known values.

Figure 7:
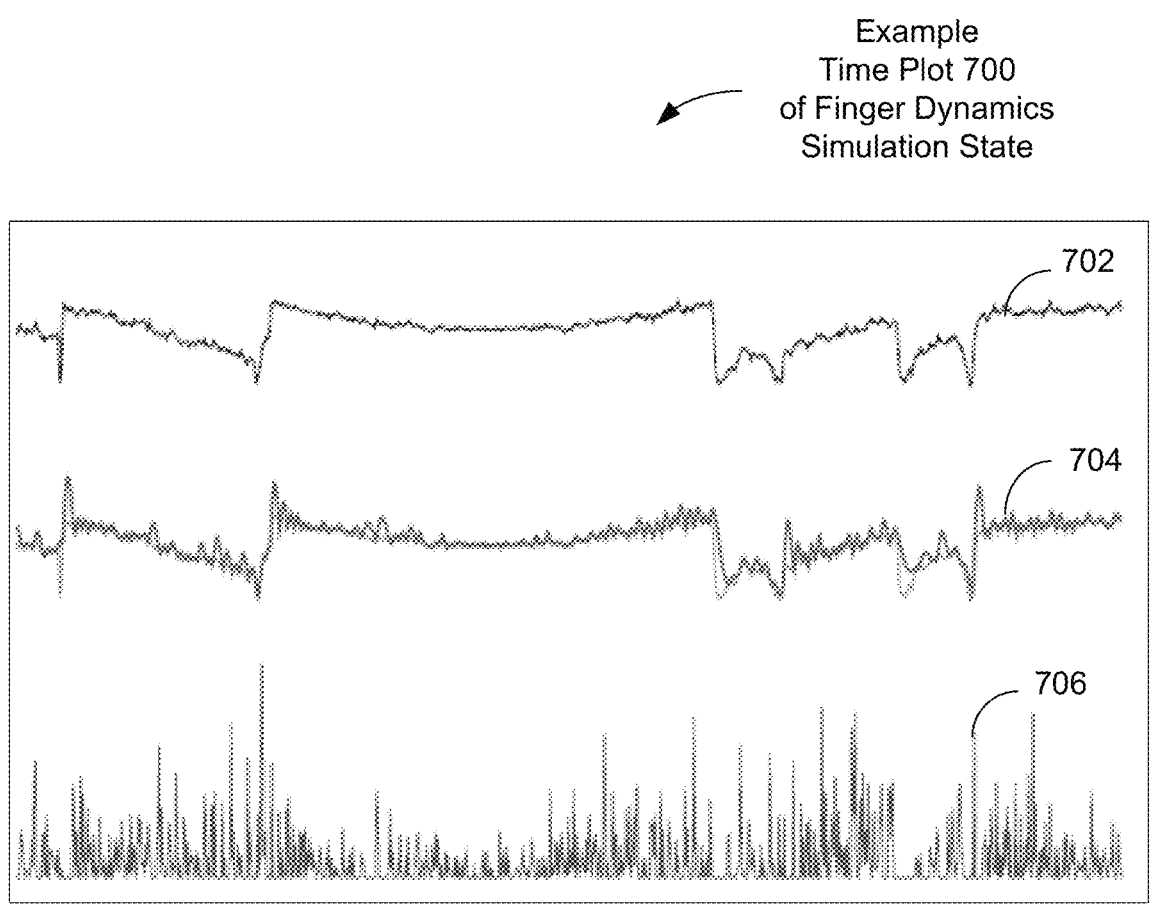
FIG. 7 illustrates an example time plot of finger dynamics simulation state, according to some embodiments.

In some embodiments, the equations of motion are numerically integrated (e.g., at a desired sampling rate, such as approximately 44 kHz) with a semi-implicit Euler integration scheme. In some embodiments, the resulting vertical displacement of the finger pad is streamed to one or more actuators (e.g., the actuator 220) as haptic feedback. In some embodiments, the micro-collision events form an impulse train that drives a modal sound synthesizer (e.g., the audio synthesis module 212) for the sliding interaction, as further described below. FIG. 7 illustrates an example time plot 700 of the finger dynamics simulation state for a sliding contact across the tiles texture shown in FIG. 3, according to some embodiments. In some embodiments, the surface height profile is reconstructed at a fixed temporal sampling rate (e.g., the plot 702 shown on the top). In some embodiments, the simulation is time-stepped to determine the vertical position of the sliding finger pad (e.g., the plot 704 shown in the middle). In some embodiments, micro-collisions are used to generate a corresponding train of impulses (e.g., the plot 706 shown in the bottom) that drive sound synthesis.

Modal Sound Synthesis

The sonic feedback generated when a solid object is struck or scraped may be attributed to its vibration on a set of resonant frequencies. Modal sound synthesis (e.g., the module 212) models the resulting sound as the output of a bank of damped harmonic oscillators excited by some input signal. In some embodiments, the response for an impulse is described by a superimposition of exponentially-decaying sinusoids at the resonant frequencies, according to the Equation (1) shown below:

$$y(t) = \sum_{n=1}^{N} a_n e^{-d_n t} \sin(2\pi f_n t) \qquad (1)$$

Figure 8A:
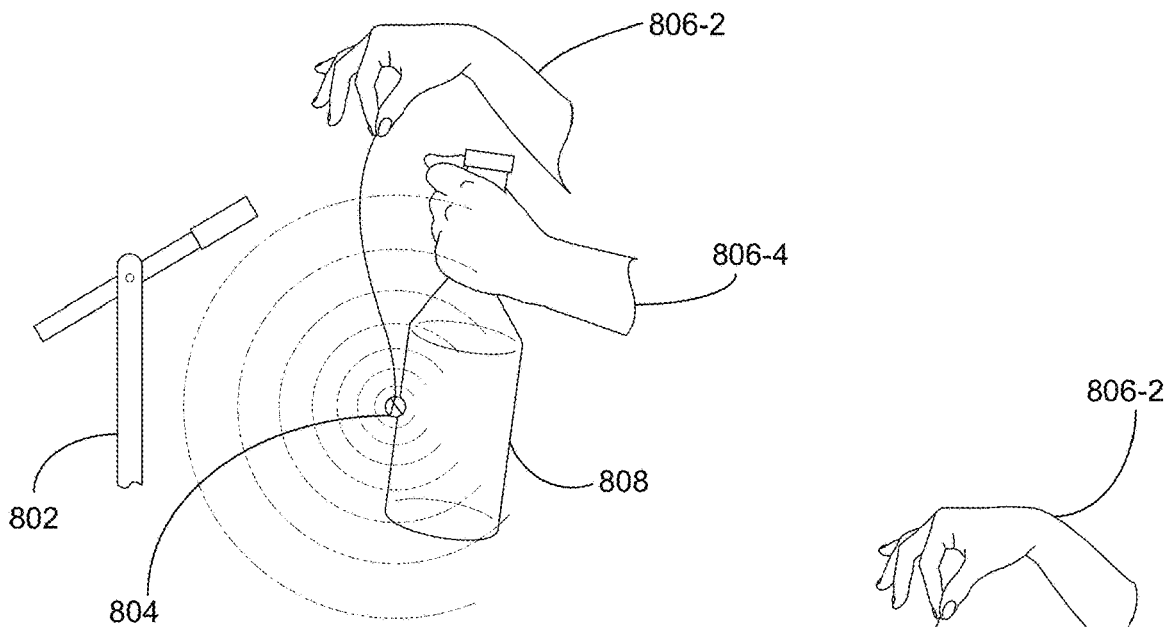
FIGS. 8A-8C illustrate examples of an experimental setup for recording approximate sonic impulse responses of various objects, according to some embodiments.
Figure 8B:
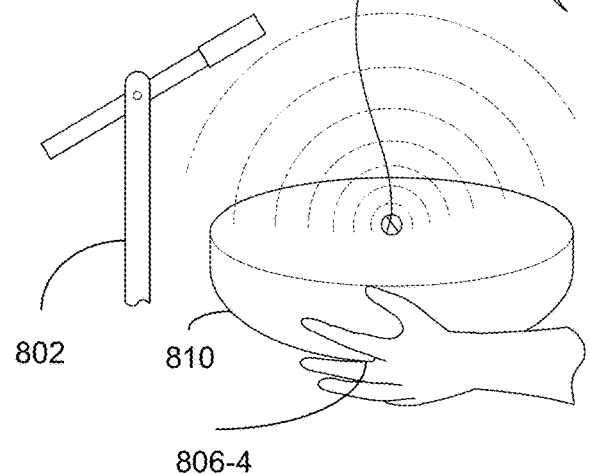
Figure 8C:
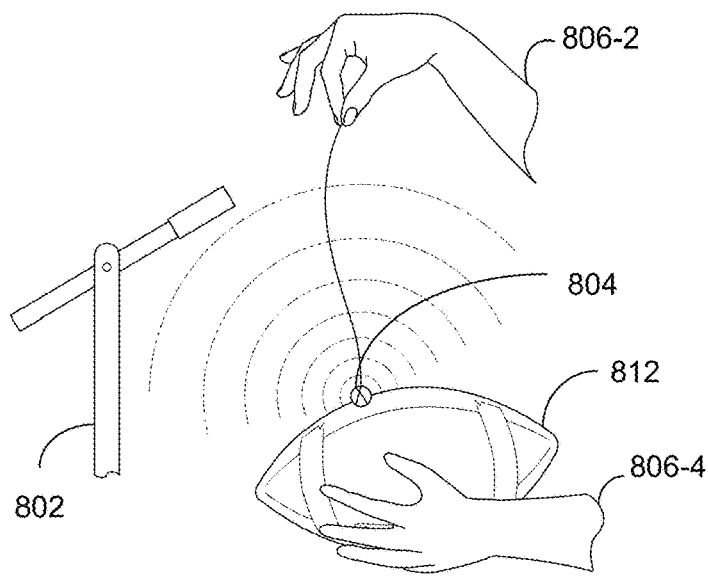

In Equation (1), the triplet (f, d, a) correspond to resonant frequency, decay coefficient, and amplitude, respectively, and characterize each vibration mode. Some embodiments estimate the modal parameters for each scene object from a single recorded exemplar. Some embodiments generate (e.g., in an offline mode) an approximate sonic impulse response for each object by striking it with a hard, steel bolt swing as a pendulum. FIGS. 8A-8C illustrate examples of an experimental setup for recording approximate sonic impulse responses of various objects, according to some embodiments. In FIGS. 8A-8C, a user is shown recording (e.g., using the microphone 802) approximate sonic impulse responses of various objects (e.g., a bottle 808 in FIG. 8A, a bowl 810 in FIG. 8B, and a football 812 in FIG. 8C) by striking them with a metal bolt 804. In the examples shown, the user is holding the object using one hand 806-4, and the metal bolt (hung by a thread) with the other hand 806-2. Some embodiments automate this recording process for a select list of objects and/or textured surfaces from the virtual environment. In some embodiments, a high-resolution subspace method is used to decompose the recorded impulse response into a series of exponentially-decaying sinusoids. In some other embodiments, different techniques are used to decompose the recorded impulse response into a series of exponentially-decaying sinusoids.

In some instances, real-time audio synthesis is performed using the modal model of resonant frequencies, decays, and amplitudes, by running an impulse (or an "excitation" signal; sometimes called an impulse train) through a bank of infinite impulse response (IIR) resonator filters. The discrete, two-pole IIR resonators may be described by a transfer function shown in Equation (2) below.

$$H_i(z) = \frac{a_i R \sin\theta z^{-1}}{1 - 2R\cos\theta z^{-1} + R^2 z^{-2}} \qquad (2)$$

In Equation (2), $R = e^{-d_i/f_s}$, $\theta = 2\pi f_i/f_s$, $f_i$ is the frequency of the mode, $d_i$ is the damping of the mode, $a_i$ is the amplitude of the mode, and $f_s$ is the audio sampling frequency.

Figure 9A:
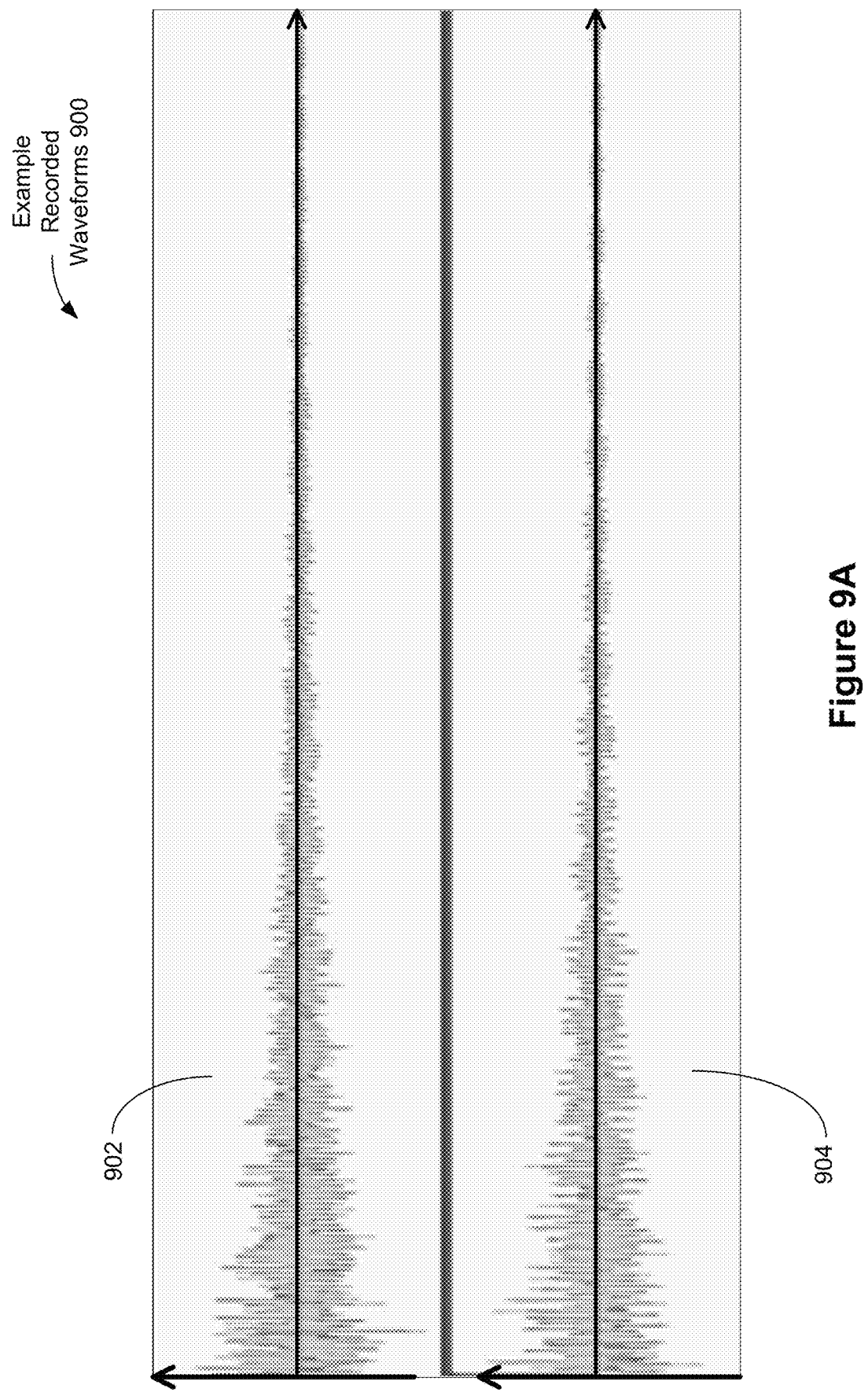
FIG. 9A illustrates examples of recorded waveforms, according to some embodiments.
Figure 9B:
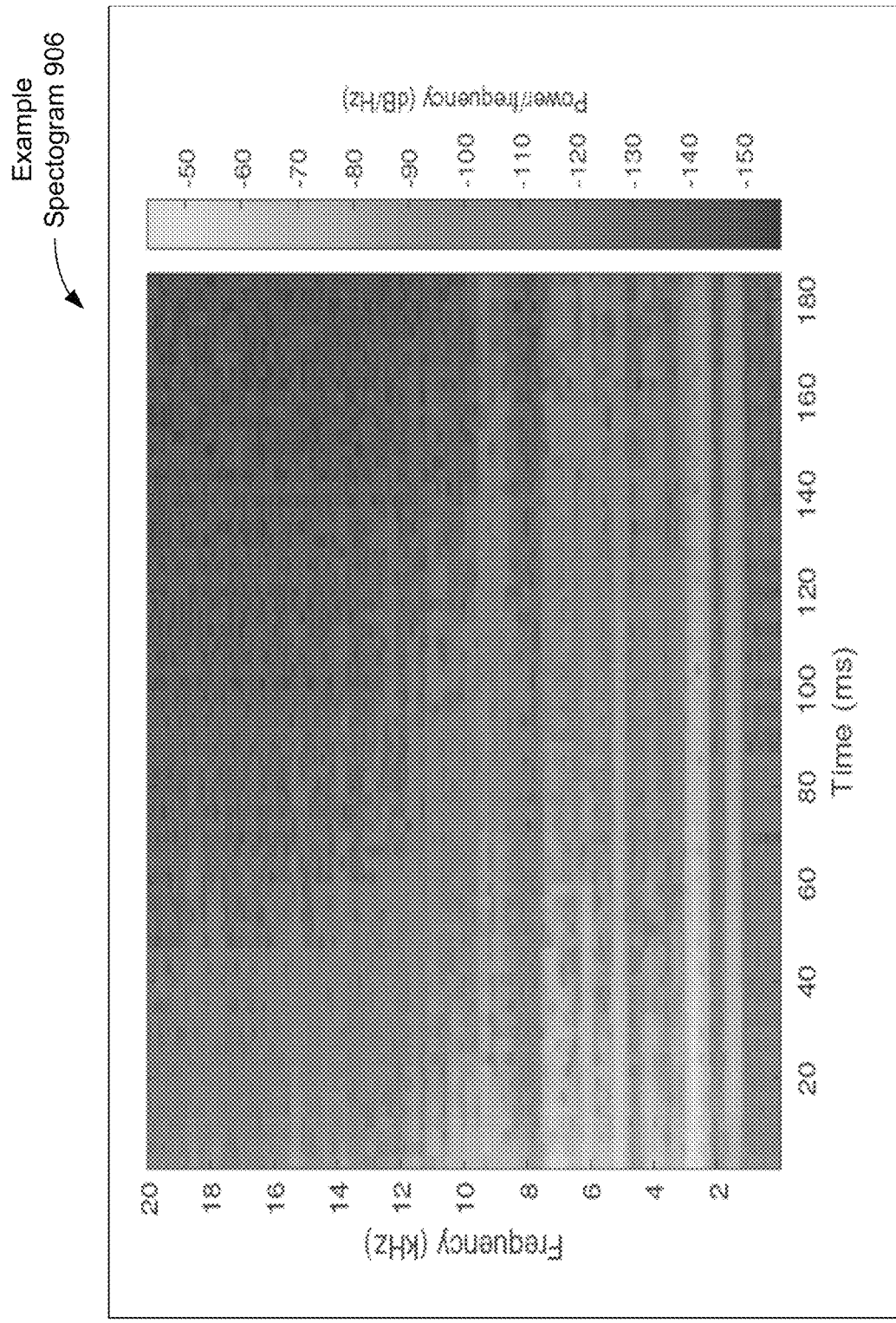
FIGS. 9B and 9C are example spectrograms for the waveforms shown in FIG. 9A, according to some embodiments.
Figure 9C:
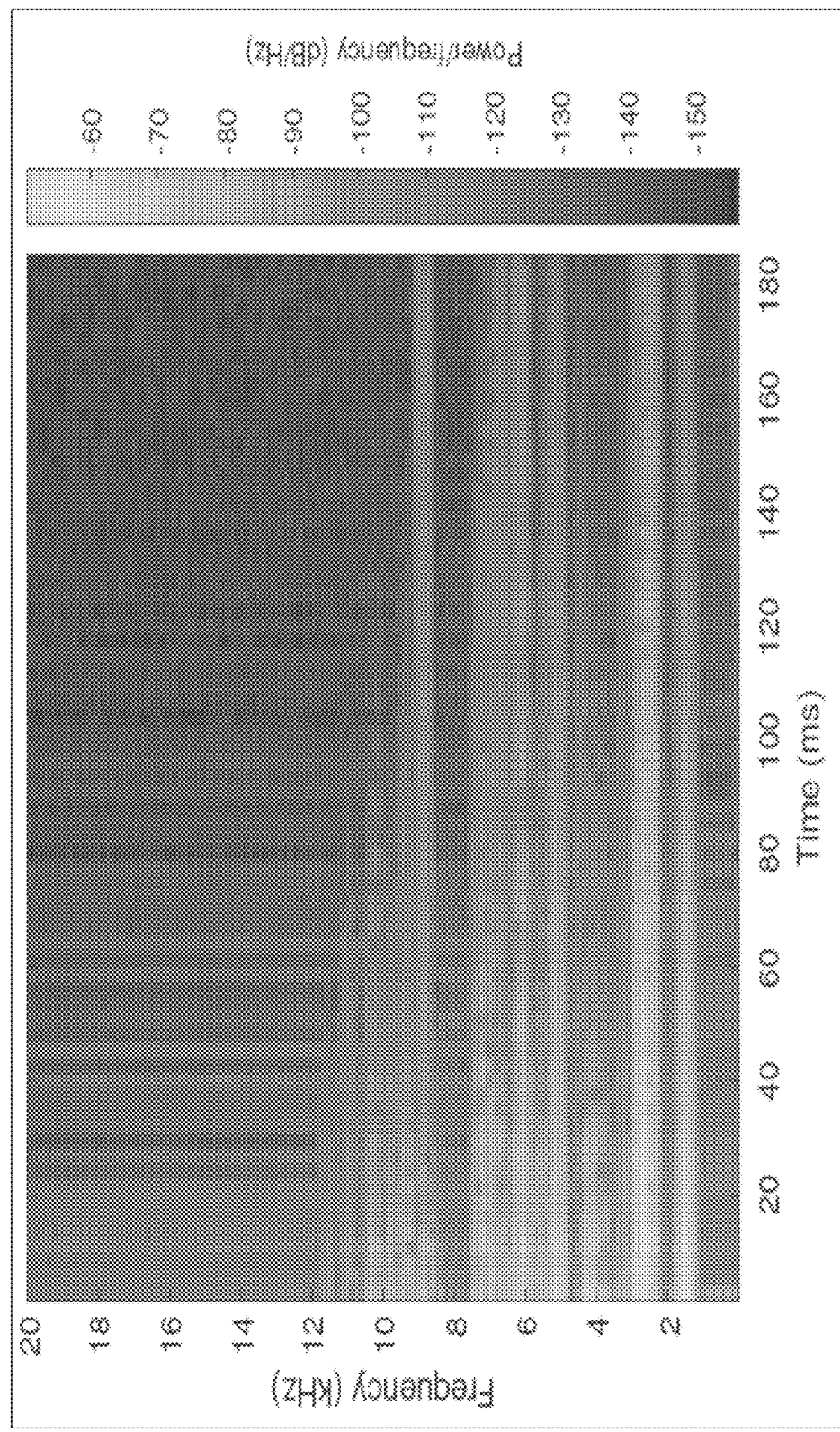

FIG. 9A illustrates examples of recorded waveforms, and FIGS. 9B and 9C are example spectrograms for the waveforms shown in FIG. 9A, according to some embodiments. FIG. 9A shows a comparison between the recorded sample and a re-synthesis of the sample using the modal resonator filter bank, according to some embodiments. In particular, the top portion 902 of FIG. 9A corresponds to a recorded waveform of the glass bottle, and the bottom portion 904 of FIG. 9A corresponds to a resynthesized waveform using 64 vibration modes. A comparison of the spectrogram of the original signal (FIG. 9B) and the spectrogram of the resynthesized signal (FIG. 9C) shows that the key modes in the sonic frequencies are captured accurately.

In some embodiments, the shape and duration of the excitation signal are used to calculate the timbre of the synthesized result. To generate impact sounds between objects of different materials, some embodiments use Hertz contact theory to determine the impact force profile. It relates force to indentation as a non-linear power law as shown in Equation (3) below.

$$F = K\delta^n \quad (3)$$

with $\delta$ being the relative indentation along the contact normal, and K the Hertz constant, dependent on the material and geometry of the colliding bodies. The exponent n usually has a value of 3/2 for solids with a parabolic distribution of contact stresses.

The Hertz constant takes the form shown in Equation (4) below, for two spheres colliding.

$$K = \frac{4}{3(\sigma_1 + \sigma_2)} \sqrt{\frac{R_1 R_2}{R_1 + R_2}} \quad (4)$$

where $R_i$ is the radius of each sphere (or the radius of curvature at the impact point on each object), and $$\sigma = \frac{(1 - v^2)}{E} \quad (5)$$

is determined by the elasticity of the material, with v and E being the Poisson ratio and Young's modulus of the material, respectively.

Writing the equations of motion of the two bodies with respect to the contact position, and taking n=3/2, results in Equation (6) shown below.

$$m\ddot{\delta} = -K\delta^{1.5} \quad (6)$$

with $$m = \frac{m_1 m_2}{m_1 + m_2}$$

being the effective mass of the system. Integrating Equation (6) with respect to time gives Equation (7) shown below.

$$\tfrac{1}{2}m(\dot{\delta}^2 - \dot{\delta}_0^2) = -\tfrac{2}{5}K\delta^{2.5} \quad (7)$$

In Equation (7), $\dot{\delta}_0$ is the initial relative constant velocity. At the instant of maximum compression, the relative indentation velocity is zero. Solving for the maximum indentation $\delta_m$ yield Equations (8) and (9) shown below.

$$-\tfrac{1}{2}m\dot{\delta}_0^2 = -\tfrac{2}{5}K\delta_m^{2.5} \quad (8)$$

$$\delta_m = \left(\frac{\tfrac{5}{4}m\dot{\delta}_0^2}{K}\right)^{2.5} \quad (9)$$

Finally, integrating Equation (7) once more with respect to time, and evaluating over the compression interval $t_0$ to $t_m$, results in an approximate expression (shown below as Equation (10)) for the total period of contact:

$$\Delta t = 2(t_m - t_0) \approx 2.94 \frac{\delta_m}{\dot{\delta}_0} \quad (10)$$

Some embodiments use the Hertz contact force profile as the excitation input signal for modal synthesis resulting in realistic impact sounds between objects of different materials. In some embodiments, the impact velocity is obtained from the macroscopic physics simulation and the other parameters required to compute the contact force profile (v, E, R, and m) are stored with the objects themselves.

In some embodiments, sound from a sliding contact between two objects results from the many micro-collisions that occur between irregularities of the contacting surfaces. Some embodiments use the series of collision events resulting from the micro-contact simulation (described earlier) to synthesize realistic sonic feedback for the interaction. In some embodiments, the same Hertz contact model for impacts is applied to each micro-collision to compute a force signal over time, sampled at a predetermined rate (e.g., 44.1 kHz), which serves as the excitation input for modal sound synthesis.

Figure 10:
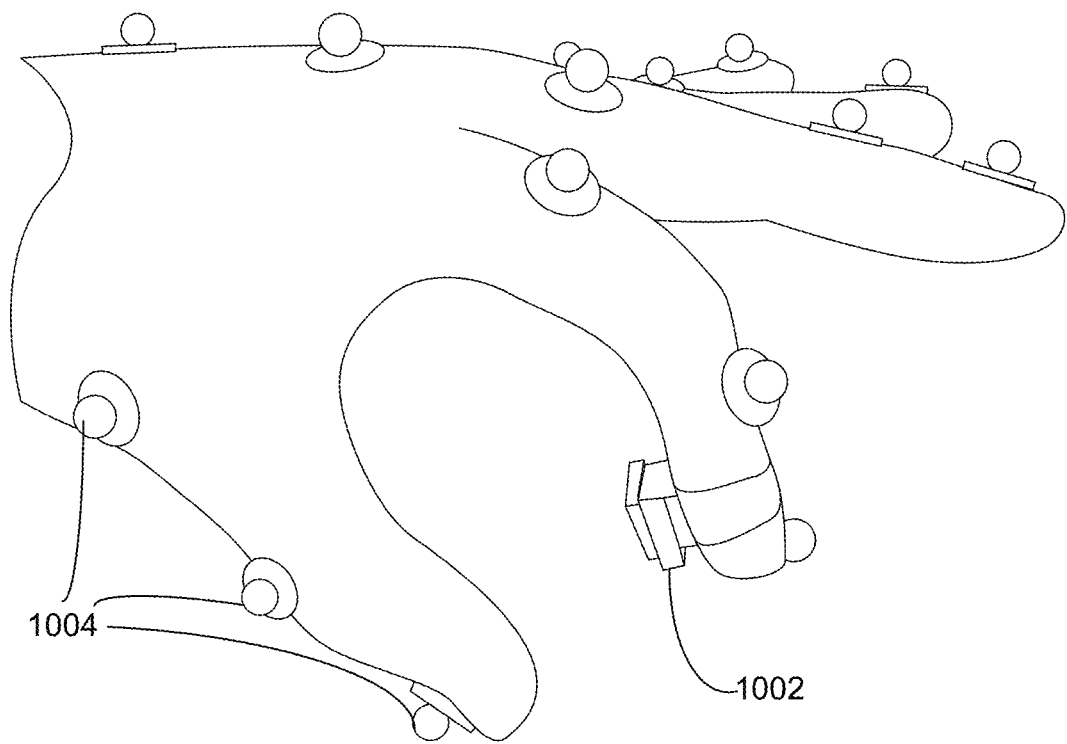
FIG. 10 illustrates an example haptic glove with a vibrotactile actuator, according to some embodiments.

In view of the principles above, the following examples are provided for some additional context. In one example, hand-tracking hardware is setup to track a user's hand. Furthermore, a variety of vibrotactile actuators may be attached to the user's fingers (e.g., attached to an index finger tip). FIG. 10 illustrates an example haptic glove 1000 with a vibrotactile actuator used to generate haptic feedback, according to some embodiments. In particular, FIG. 10 shows a pose-tracked glove (tracked by one or more sensors 1004, which are examples of the sensors 124, FIG. 1C) with a vibrotactile actuator 1002 mounted to the index fingertip, according to some embodiments. Some embodiments include a glove with an array of vibrotactile actuators. Some embodiments include a VR (or an AR) headset used for immersive VR experience, such as the head-mounted display 110 in FIGS. 1A and 1C.

Some embodiments render spatialized, synthesized sounds were spatialized through headphones. Some embodiments use a feedback mechanism to evaluate the realism of user experience, and/or to adjust one or more parameters of the simulation models. Some embodiments render textured surfaces to kinesthetic (haptic) devices. Some embodiments generate transitive haptics by rendering vibrotactile feedback when a user holds one object to hit and/or scrape another object or textured surface. Some embodiments generate active damping using the techniques described herein. For example, when a user strikes a cymbal, then some embodiments can generate feedback that corresponds to a touch to silence the vibration. Some embodiments account for object shape in one or more simulations described above. Some embodiments derive modal model from a single recording, while some embodiments derive modal model from a series of recordings. Some embodiments separately model material characteristics and geometry. Some embodiments model rolling contact using different contact mechanics models than the ones described above.

Figure 11:
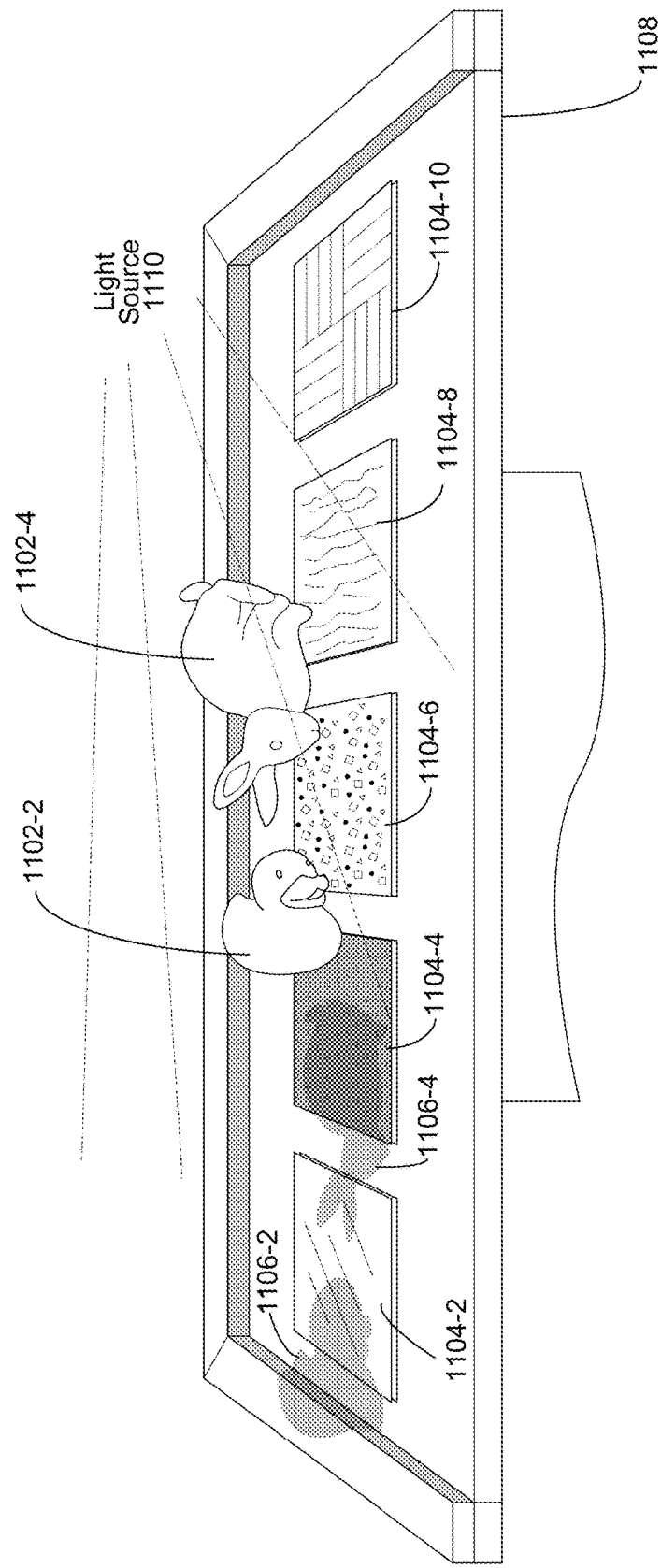
FIG. 11 illustrates an example virtual scene with textured objects, according to some embodiments.

FIG. 11 illustrates an example virtual scene 1100 with textured objects (e.g., the textured surfaces 1104-2, 1104-4, 1104-6, 1104-8, and 1104-10) that a user can interact with, according to some embodiments. In the example shown, two virtual objects 1102-2 and 1102-4 are seen floating over the surface of a table 1108, a light source 1110 is seen illuminating the virtual scene, thereby causing the shadows 1106-2 and 1106-4 of the virtual objects 1102-2, and 1102-4, respectively. Some embodiments generate synchronized haptic and sound feedback for the user interactions in this virtual scene, in real-time, thereby complementing or adding to the visual realism (e.g., the shadows for the virtual objects).

FIGS. 12A-12G are flowcharts of a method 1200 for generating synchronized auditory and haptic feedback for artificial-reality environments, according to some embodiments. The method is performed (1202) at a computer (e.g., the computer system 130) that is in communication with an audio device (.g., the head-mounted display 110 with the one or more audio devices 118) and a haptic device (e.g., the haptic device 120*a*). The method includes performing (1204) a simulation (sometimes called macro simulation, macroscopic simulation, or physics simulation) of a user interaction with a virtual object in an artificial-reality environment. Examples of the simulation are described above in reference to FIG. 2, and under the section titled Macroscopic Simulation of Interaction. The user interaction (i) traverses a surface of the virtual object (e.g., running a finger over a textured surface), and (ii) includes a set of contact events (e.g., a sparse set of events). Examples of user interaction are described above in reference to FIG. 5, according to some embodiments. The method also includes estimating (1206) a trajectory of the user interaction with the virtual object based on the set of contact events. Examples of trajectory estimation are described above in reference to FIG. 5, according to some embodiments. The method also includes determining (e.g., computing) (1208) a surface profile associated with the surface of the virtual object. The method also includes generating (1210) an excitation force profile according to (i) the estimated trajectory and (ii) the surface profile. The method also includes rendering (1212), based on the excitation force profile, audio and synchronized haptic feedback for the user interaction.

Referring next to FIG. 12B, in some embodiments, performing the simulation includes obtaining (1214) sparsely sampled contact information of the user interaction. In some instances, the sampled contact information includes position information, velocity information, and force information of the user interaction. Referring next to FIG. 12C, in some embodiments, performing the simulation further includes capturing (1216) meso-level geometric features of the surface of the virtual object (e.g., the directional grains on a wooden surface, the mortar-filled grooves on a tiled surface, i.e., surface textures). Referring next to FIG. 12D, in some embodiments, performing the simulation includes generating (1218) information on the contact events at a rate of approximately 60 Hz.

Referring next to FIG. 12E, in some embodiments, estimating the trajectory includes interpolating (1220) contact positions with the contact events of the user interaction, and each contact position corresponds to a relief height over the surface of the virtual object. In some embodiments, the method further includes applying (1222) a filter (e.g., a low-pass filter or a Kalman filter) to the estimated trajectory to smooth the estimated trajectory. In some embodiments, the contact positions interpolated (1224) with the contact events of the user interaction are sampled at a predetermined rate (e.g., the rate matches the temporal rate required, say 44100 Hz, for the excitation force profile).

Referring next to FIG. 12E, in some embodiments, determining the surface profile includes generating (1226) a height profile of the surface of the virtual object along the estimated trajectory of the user interaction, and applying one or more surface parameters of the surface of the virtual object to the height profile to obtain the surface profile. In some embodiments, generating the height profile of the surface further includes calculating (1228) the height profile based on meso-level surface geometry corresponding to the virtual object. In some embodiments, generating the height profile of the surface further includes indexing (1230) the meso-level surface geometry from one or more texture-map images associated with the virtual object. In some embodiments, the one or more surface parameters correspond to a texture of the surface of the virtual object, the one or more surface parameters includes a surface roughness parameter for the texture of the surface, and applying the one or more surface parameters includes adding micro-level geometry via fractal noise controlled by the surface roughness parameter. In some embodiments, the surface roughness parameter includes surface texture and roughness material qualities (e.g., metrics) associated with the virtual object. In some embodiments, the surface roughness parameter includes attributes created or assigned by a scene artist, or inferred or captured directly from a real-world counterpart of the virtual object.

Figure 12A:
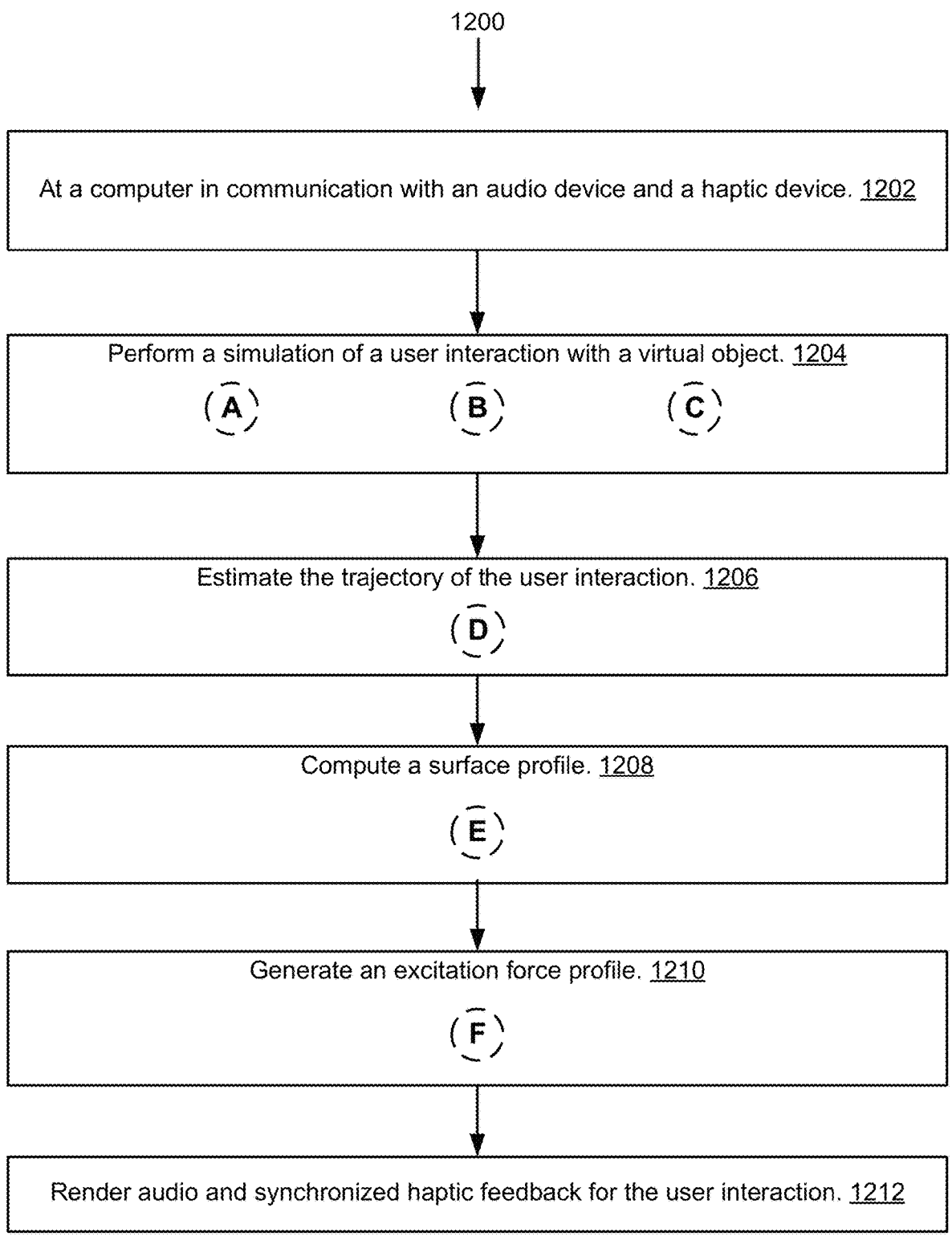
Figure 12F:
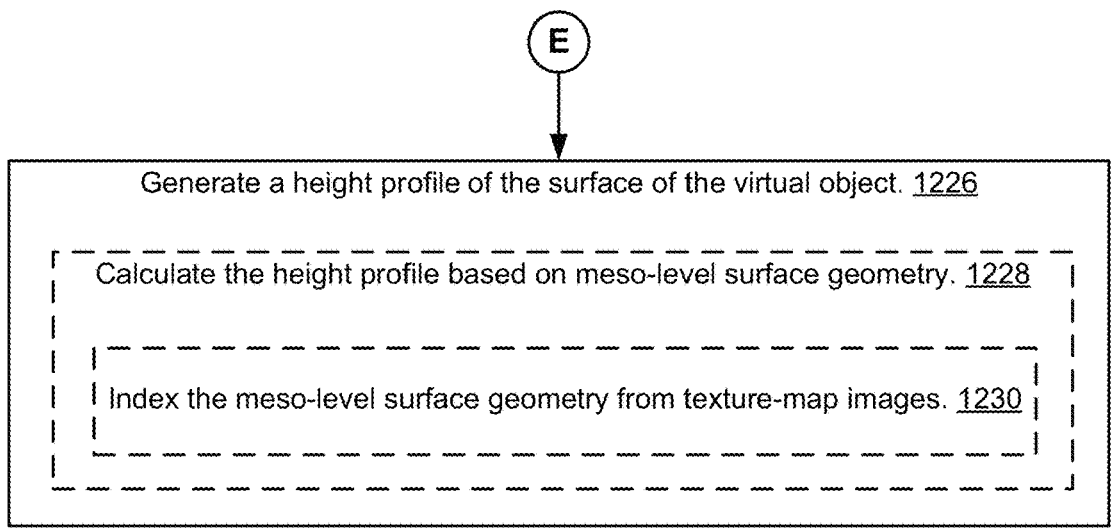
Figure 12G:
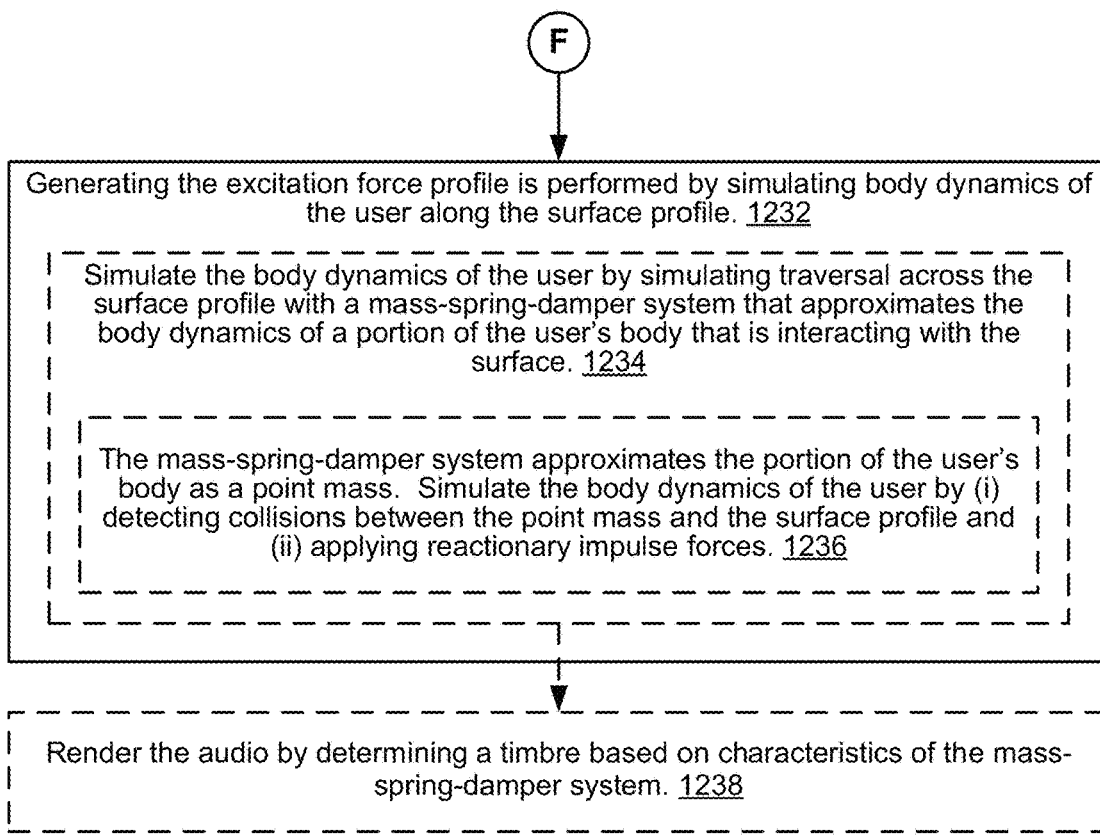

Referring next to FIG. 12G, in some embodiments, the method further includes simulating (1232) body dynamics of the user along the surface profile, and generating the excitation force profile is further performed according to the simulated body dynamics of the user. Some embodiments generate the excitation force profile by means of numerical integration of the equations of motion. Some embodiments analyze and record the body-surface collisions while simulating body dynamics of the user. In some embodiments, simulating the body dynamics of the user comprises simulating (1234) traversal across the surface profile with a mass-spring-damper system that approximates the body dynamics of a portion of the user's body (e.g., fingertip) that is interacting with the surface. In some embodiments, the mass-spring-damper system approximates (1236) the portion of the user's body as a point mass, and simulating the body dynamics of the user further includes (i) detecting collisions between the point mass and the surface profile and (ii) applying reactionary impulse forces. In some embodiments, rendering the audio includes determining (1238) a timbre based on (i) characteristics of the mass-spring-damper system (rather than following an input profile precisely, as is the case with a phonograph model) and (ii) the surface profile. In some embodiments, rendering the audio includes applying one or more numerical methods (e.g., semi-implicit Euler integration) to integrate equations of motion (e.g., at audio rates) derived from the mass-spring-damper system.

Thus, in various embodiments, systems and methods are described that synthesize and/or render sound and/or vibrotactile haptic feedback. Some embodiments simultaneously synthesize sound and/or haptic feedback by using material and geometric representations of virtual objects, and/or one or more recordings of sonic signature of the virtual objects. In some embodiments, geometric descriptions of the virtual objects at the macro, meso, and micro detail levels are derived directly from their polygonal models and texture maps, some of which are readily available from their use for physically-based visual rendering. As wearable haptic displays continue to gain prevalence, the methods described herein serve as a means to add high-quality haptic and sonic feedback to existing virtual environments with realistic, detailed visuals.

Although some of various drawings illustrate a number of logical stages in a particular order, stages, which are not order dependent, may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the precise forms disclosed. Many modifications and variations are possible in view of the above teachings. The embodiments were chosen and described in order to best explain the main principles and practical applications, to thereby enable others skilled in the art to best utilize the various embodiments and make various modifications as are suited to the particular use contemplated.

What is claimed is:

1. A method of generating synchronized auditory and haptic feedback for artificial-reality environments, the method comprising:
    performing a simulation of a user interaction with a virtual object in an artificial-reality environment, wherein the user interaction (i) traverses a surface of the virtual object and (ii) includes a set of contact events;
    estimating a trajectory of the user interaction with the virtual object based on the set of contact events;
    determining a surface profile associated with the surface of the virtual object;
    generating an excitation force profile according to (i) the estimated trajectory and (ii) the surface profile; and
    rendering, based on the excitation force profile, audio and synchronized haptic feedback for the user interaction, based on applying one or more numerical methods to integrate equations of motion derived from a mass-spring-damper system used to approximate body dynamics of a portion of the user's body that is interacting with the surface.

2. The method of claim 1, wherein determining the surface profile comprises:
    generating a height profile of the surface of the virtual object along the estimated trajectory of the user interaction; and
    applying one or more surface parameters of the surface of the virtual object to the height profile to obtain the surface profile.

3. The method of claim 2, wherein:
    the one or more surface parameters correspond to a texture of the surface of the virtual object;
    the one or more surface parameters include a surface roughness parameter for the texture of the surface; and
    applying the one or more surface parameters comprises adding micro-level geometry via fractal noise controlled by the surface roughness parameter.

4. The method of claim 3, wherein the surface roughness parameter includes surface texture and roughness material qualities associated with the virtual object.

5. The method of claim 3, wherein the surface roughness parameter includes:
    attributes created or assigned by a scene artist, or
    inferred or captured directly from a real-world counterpart of the virtual object.

6. The method of claim 2, wherein generating the height profile of the surface further comprises calculating the height profile based on meso-level surface geometry corresponding to the virtual object.

7. The method of claim 6, wherein generating the height profile of the surface further comprises indexing the meso-level surface geometry from one or more texture-map images associated with the virtual object.

8. The method of claim 1, wherein:
    the method further comprises simulating body dynamics of the user along the surface profile; and
    generating the excitation force profile is further performed according to the simulated body dynamics of the user.

9. The method of claim 8, wherein simulating the body dynamics of the user comprises simulating traversal across the surface profile with the mass-spring-damper system.

10. The method of claim 9, wherein:
    the mass-spring-damper system approximates the portion of the user's body as a point mass, and
    simulating the body dynamics of the user further comprises (i) detecting collisions between the point mass and the surface profile and (ii) applying reactionary impulse forces.

11. The method of claim 9, wherein rendering the audio comprises determining a timbre based on (i) characteristics of the mass-spring-damper system and (ii) the surface profile.

12. The method of claim 1, wherein estimating the trajectory comprises interpolating contact positions with the contact events of the user interaction, and each contact position corresponds to a relief height over the surface of the virtual object.

13. The method of claim 12, further comprising applying a filter to the estimated trajectory to smooth the estimated trajectory.

14. The method of claim 12, wherein the contact positions interpolated with the contact events of the user interaction are sampled at a predetermined rate.

15. The method of claim 1, wherein performing the simulation comprises obtaining sparsely sampled contact information of the user interaction, including position, velocity, and force of the user interaction.

16. The method of claim 1, wherein performing the simulation further comprises capturing meso-level geometric features of the surface of the virtual object.

17. The method of claim 1, wherein performing the simulation comprises generating information on the set of contact events at a rate of approximately 60 Hz.

18. An artificial-reality device for generating synchronized auditory and haptic feedback for artificial-reality environments, the artificial-reality device comprising:
    one or more processors;
    memory that stores one or more programs configured for execution by the one or more processors, and the one or more programs comprising instructions for:
        performing a simulation of a user interaction with a virtual object in an artificial-reality environment, wherein the user interaction (i) traverses a surface of the virtual object and (ii) includes a set of contact events;
        estimating a trajectory of the user interaction with the virtual object based on the set of contact events;
        determining a surface profile associated with the surface of the virtual object;

generating an excitation force profile according to (i) the estimated trajectory and (ii) the surface profile; and rendering, based on the excitation force profile, audio and synchronized haptic feedback for the user interaction, including determining a timbre based on (i) characteristics of a mass-spring-damper system used to approximate body dynamics of a portion of the user's body that is interacting with the surface and (ii) the surface profile.

19. The artificial-reality device of claim 18, wherein the one or more programs further comprise instructions for simulating the body dynamics of the user along the surface profile, and wherein generating the excitation force profile is further performed according to the simulated body dynamics of the user.

20. A non-transitory computer-readable storage medium storing one or more programs configured for execution by an artificial-reality device having one or more processors, the one or more programs including instructions, which when executed by the one or more processors, cause the artificial-reality device to:

perform a simulation of a user interaction with a virtual object in an artificial-reality environment, wherein the user interaction (i) traverses a surface of the virtual object and (ii) includes a set of contact events;

estimate a trajectory of the user interaction with the virtual object based on the set of contact events;

determine a surface profile associated with the surface of the virtual object;

generate an excitation force profile according to (i) the estimated trajectory and (ii) the surface profile; and render, based on the excitation force profile, audio and synchronized haptic feedback for the user interaction, based on applying one or more numerical methods to integrate equations of motion derived from a mass-spring-damper system used to approximate body dynamics of a portion of the user's body that is interacting with the surface.

* * * * *